United States Patent
Taylor

(10) Patent No.: US 6,857,177 B2
(45) Date of Patent: Feb. 22, 2005

(54) SYSTEM FOR PRESETTING SHRINK-FIT TOOLS

(75) Inventor: George S. Taylor, Bad Axe, MI (US)

(73) Assignee: Gemini Group, Inc., Bad Axe, MI (US)

( * ) Notice: Subject to any disclaimer, the term of this patent is extended or adjusted under 35 U.S.C. 154(b) by 10 days.

(21) Appl. No.: 10/362,847

(22) PCT Filed: Aug. 30, 2001

(86) PCT No.: PCT/US01/41951

§ 371 (c)(1), (2), (4) Date: Feb. 27, 2003

(87) PCT Pub. No.: WO02/18093

PCT Pub. Date: Mar. 7, 2002

(65) Prior Publication Data

US 2004/0010897 A1 Jan. 22, 2004

Related U.S. Application Data

(60) Provisional application No. 60/230,533, filed on Sep. 1, 2000.

(51) Int. Cl.[7] ................................................ B23P 11/02
(52) U.S. Cl. ........................ 29/447; 29/800; 29/407.1; 29/407.05
(58) Field of Search ...................... 29/447, 800, 407.1, 29/407.05, DIG. 35, 407.08, 407.09

(56) References Cited

U.S. PATENT DOCUMENTS

| | | | | |
|---|---|---|---|---|
| 5,035,556 A | * | 7/1991 | Lamotte et al. | 409/218 |
| 5,277,435 A | * | 1/1994 | Kramer et al. | 29/447 |
| 5,280,671 A | * | 1/1994 | Marquart | 29/447 |
| 6,216,335 B1 | * | 4/2001 | Freyermuth | 29/800 |
| 6,588,083 B2 | * | 7/2003 | Voss et al. | 409/232 |
| 6,629,480 B1 | * | 10/2003 | Freyermuth et al. | 82/118 |
| 6,722,008 B2 | * | 4/2004 | Flick | 29/281.5 |
| 6,755,228 B2 | * | 6/2004 | Kelch | 29/447 |
| 2003/0041434 A1 | * | 3/2003 | Flick | 29/407.05 |
| 2003/0057202 A1 | * | 3/2003 | Maxson | 219/635 |
| 2003/0070286 A1 | * | 4/2003 | Chalmers et al. | 29/800 |
| 2003/0088972 A1 | * | 5/2003 | Haimer | 29/700 |
| 2004/0080089 A1 | * | 4/2004 | Haimer et al. | 269/58 |
| 2004/0111855 A1 | * | 6/2004 | Pfau | 29/800 |

FOREIGN PATENT DOCUMENTS

DE          10015322 A1    *   10/2001
JP        2001-129728 A   *   5/2001

OTHER PUBLICATIONS

Eastman, "Shrink–Fit Toolholding", Cutting Tool Engineering Magazine, Apr. 1997/vol. 49/No. 3, 5 pages.*

* cited by examiner

*Primary Examiner*—Erica Cadugan
(74) *Attorney, Agent, or Firm*—Varnum Riddering Schmidt & Howie & LLP

(57) ABSTRACT

A presetting system (100) is disclosed for accurately presetting the position of a tool (106) within a shrink-fit holder (148). The presetting system (100) includes a presetter measuring device (102) which is adapted to provide an initial length measurement of the tool (106), and verification of the preset position of the tool (106) within the shrink-fit tool holder (148). The system (100) also provides for incorporating a temperature compensation factor within the presetting process, for compensating for temperature and dimensional changes of the tool (106) during heating processes.

18 Claims, 19 Drawing Sheets

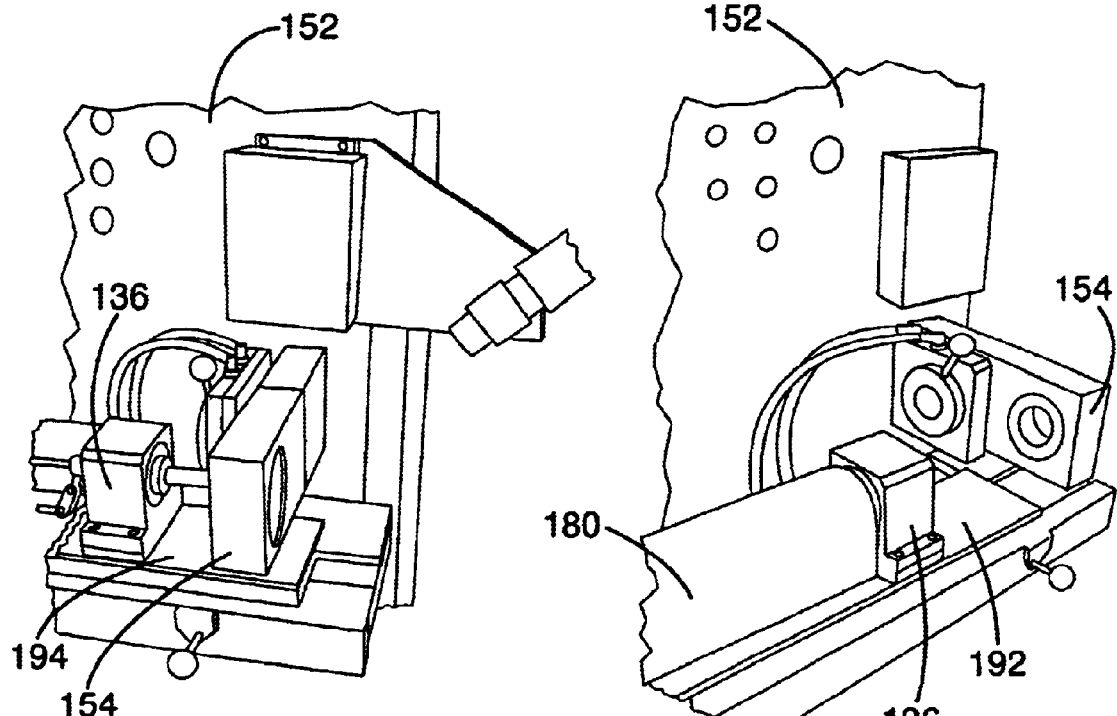
Fig. 9
Fig. 10
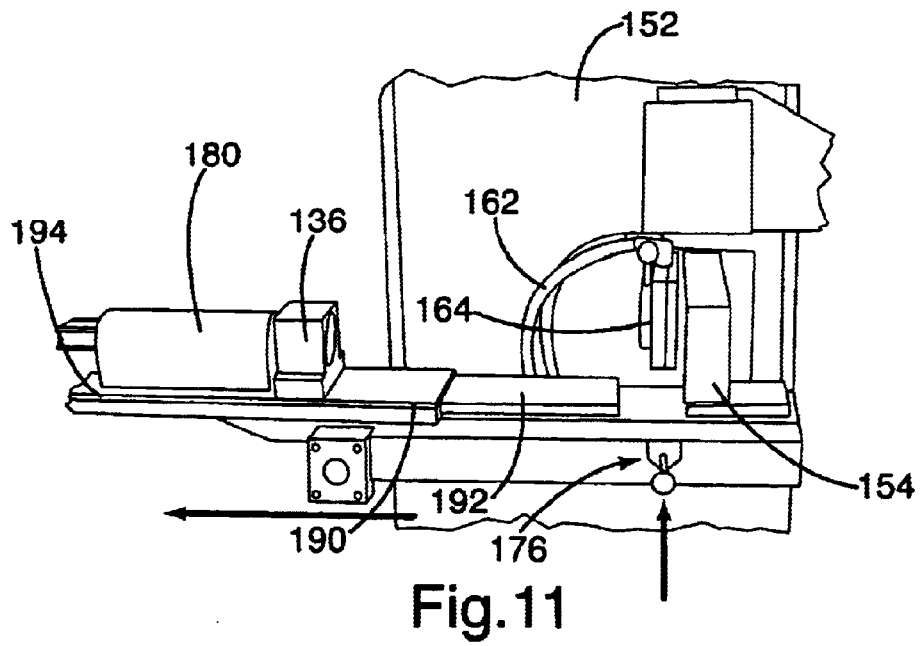
Fig. 11

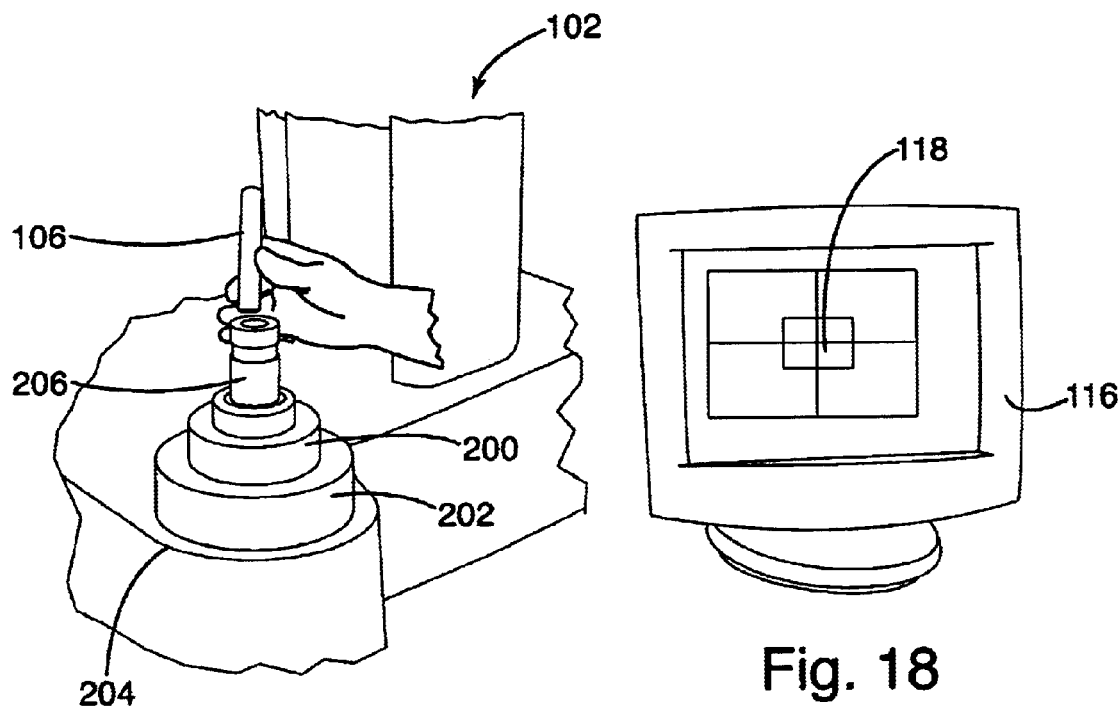
Fig. 17
Fig. 18
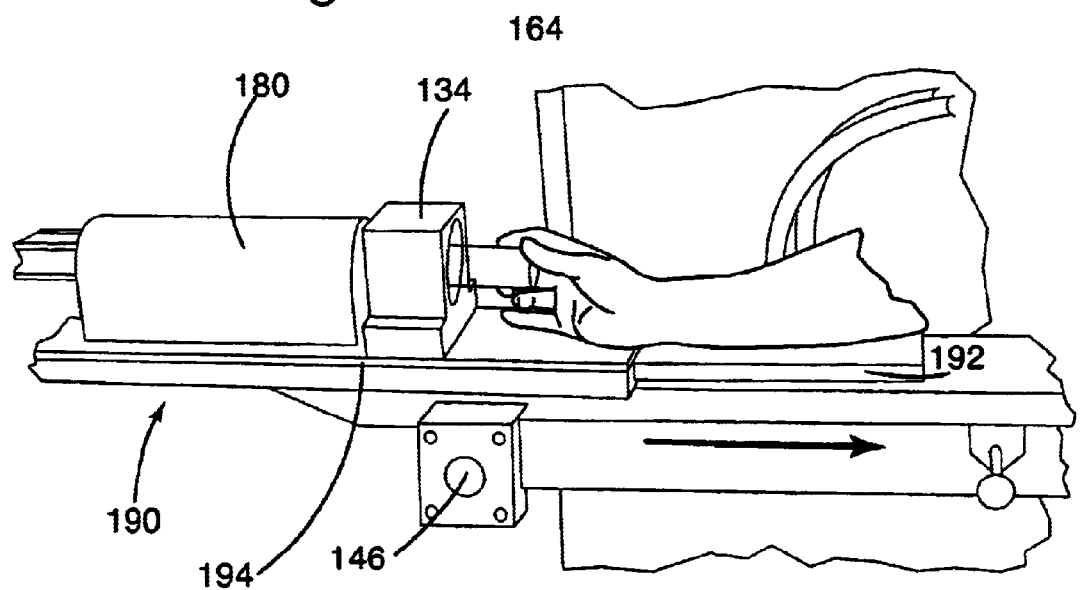
Fig. 19

SYSTEM FOR PRESETTING SHRINK-FIT TOOLS

CROSS-REFERENCE TO RELATED APPLICATIONS

This application claims the benefit of U.S. Provisional application Ser. No. 60/230,533 filed Sep. 1, 2000.

STATEMENT REGARDING FEDERALLY SPONSORED RESEARCH OR DEVELOPMENT

Not applicable.

REFERENCE TO A MICROFISHE APPENDIX

Not applicable.

BACKGROUND OF THE INVENTION

The invention relates to a system for assembly of tools within tool holders and, more particularly, apparatus and methods for accurately positioning a tool within a shrink-fit tool holder.

In the machining industries, it is well known to utilize cutting tools for performing various types of cutting operations on work pieces. Numerous types of cutting machines utilize tools which are positioned within tool holders. The tool holders are mounted on spindles or the like which, in turn, are associated with various types of machine tools.

One important aspect of machining processes relates to accuracy of work piece cutting and, more particularly, to accurate positioning of the cutting tool relative to the work piece. This activity is often referred to as high tolerance machining. Such accuracy is required in all three dimensions. To achieve the requisite accuracy, it is known to employ what is commonly referred to as "shrink-fit" clamping or holding of tools within tool holders. For example, Marquart, U.S. Pat. No. 5,992,860 issued Nov. 30, 1999, discloses a chucking device for mounting a tool on a machine tool. The machine tool includes a mounting section for mounting the chucking device. The machine tool also includes a thermally expandable shrink section. This shrink section includes a holding section which is intended to receive the tool in a shrink-fit relationship. An advantage of utilizing shrink-fit clamping of tools within tool holders is that such clamping provides a substantially concentric configuration. That is, the tool tends to be positioned (and also tends to remain) in a substantially centered configuration. In addition, shrink-fit clamping of tools will typically permit high speed rotation of the tools themselves, without problems such as "jittering" of the tools within the tool holders.

Shrink-fit clamping of tools is particularly well known in the CNC machine markets. However, although precision in positioning tools within shrink-fit tool holders can be readily achieved in two dimensions (i.e., accurate centering of the tool), conventional methods of clamping tools within tool holders in a shrink-fit configuration do not currently provide high accuracy in setting the axial position or "set length" of the tool.

For many types of conventional CNC equipment, high accuracy positioning of the tool within the tool holder is not of primary importance. For example, in a CNC machine employing a drilling head with a single drilling tool positioned within a shrink-fit tool holder, the tool position, relative to a table or the like holding the work piece to be drilled, can be essentially "calibrated." That is, the CNC machine can be positioned so as to axially move the drilling tool and/or the table so that the terminal end of the drilling tool is initially positioned at what could be characterized as a "zero" or "base" point along a z-axis. This capability of relative positioning of the table and the drilling tool can compensate for lack of high tolerances in the positioning of the tool within the tool holder.

The foregoing description of relative positioning of a drilling tool and a work piece table may be sufficient for certain types of CNC or similar machine tool equipment. However, for other somewhat "nonconventional" or "specialized" CNC or similar machine tools, relative movement of a cutting tool and a work piece table may not be realizable. For example, machine tools in the automotive industry will often use a single machine tool head having multiple drilling or cutting tools, all possibly operating on a single work piece or the like. In this type of multiple tool configuration, it is not possible to adjust the zero or base points of the tools merely by relative repositioning of the tools and the work piece table. That is, as an example, the terminal ends of the cutting tools may be required to all be positioned within the same x-y plane. However, initial positioning of each of the tools within its respective tool holder may not permit the terminal ends of the tools to be positioned within a single plane.

Another issue which arises in the machining industries relates to growth/shrinkage of machine tool components in response to temperature changes. Such growth/shrinkage can readily effect accuracy in positioning of tools. This issue is recognized in Keehn, U.S. Pat. No. 5,421,683 issued Jun. 6, 1995. The Keehn patent discloses a gear shaving machine for cutting a series of work piece gears. The machine includes a computer-operated servomotor, servo-driver and computer for compensating for machine tool growth/shrinkage. The compensation facilitates uniformity in the depth of cut on successive work pieces. Although the Keehn patent deals with temperature compensation, it is not directed to any type of configuration for accurately positioning a tool within a shrink-fit tool holder. Instead, control is provided so as to regulate infeed distance. Also, the Keehn patent primarily relates to adjustments required as a result of thermal instability of the entirety of the machine tool.

Numerous other patent references are directed to concepts associated with machine tools and apparatus and methods for positioning tools within tool holders. For example, Yamaguchi, et al., U.S. Pat. No. 5,140,739 issued Aug. 25, 1992, is directed to a specific type of spindle unit and tool clamping article for machine tools. More specifically, a spindle head rotatably mounts a main spindle having an adapter which is shrink-fit on one end thereof. The adapter includes a sub-shaft portion onto which is positioned a shrink-fit tool holder. The tool holder mounts a conventional grindstone.

Bulen, U.S. Pat. No. 5,920,974 issued Jul. 13, 1999, discloses a reconfigurable gantry tool, with a reconfigurable tool system. The reconfigurable system includes a series of gantry tools which are coupled to one another so as to form a non-matrix assembly line. The illustrated embodiment is directed to machining of precision drill holes on work pieces involving the aircraft industry. Linear actuators and CNC systems are disclosed for precision drilling. Hira, U.S. Pat. No. 5,444,640 issued Aug. 22, 1995, generally discloses the concept of numerical control methods for correction of thermal displacement in machine tools.

BRIEF SUMMARY OF THE INVENTION

Advantageously, the invention is directed to a presetting system for accurately presetting the position of a tool within a shrink-fit tool holder. The presetting process occurs in a relatively rapid manner, with a relatively short operating cycle time per tool. The presetting system includes means for generating designation signals indicative of designations of specific ones of the tool and the tool holder to be used for a specific presetting process cycle. Means are also provided for generating set length signals indicative of an appropriate set length for the designated tool and tool holder.

Of primary importance, the system includes presetter shrink-fit apparatus which is responsive to the designation signals and the set length signals for presetting the position of the designated tool within the designated tool holder. The shrink-fit apparatus includes stop means and depth set means for positioning the stop means relative to the designated tool holder. In this manner, a physical abutment is provided for the designated tool. Clamping means are also provided for holding the tool holder in an appropriate position in the shrink-fit apparatus. A heating assembly is utilized to heat and provide thermal expansion of the designated tool holder, and a cooler assembly is provided which is utilized to cool the designated tool holder.

Advantageously, the system also includes compensation means, for compensating for changes in dimensions of the designated tool which result from temperature changes in the tool during a heating cycle of the shrink-fit process. The system may also include a slide assembly for mounting the depth set means and a clamping means, so as to be extendable and retractable relative to the cooling assembly and the heating assembly. Still farther, the system may also include a measuring device, having length measuring means for providing an initial length measurement of the tool. The measuring device can include verification means for verification of a preset position of the designated tool within the tool holder.

With respect to the cooler assembly, the assembly may comprise means for moving the assembly in a lateral direction along a two dimensional plane, relative to the positioning of the tool within the depth set means. Still further, the presetting system may include system actuator controls for applying the set length signals to the presetter shrink-fit apparatus. In addition, the heating assembly may include an induction heating system.

The shrink-fit apparatus can also include motor means mechanically interconnected to the depth set means. The depth set means can include an actuator directly controlled by the motor means, with the actuator axially engaging a servo-driven actuator rod. The actuator rod is axially controllable in its position by the actuator, and the stop means is mechanically interconnected to a terminal end of the servo-driven actuator rod. The stop means can include a stop rod mechanically interconnected to the terminal end of the servo-driven actuator rod, with the stop rod providing a physical abutment of the designated tool within the shrink-fit tool holder.

The cooler assembly can include a cooler block handle assembly having an elongated slide handle manually extendable and mechanically interconnected through linkage means to a cooler block. The slide handle is movable in a lateral direction relative to an axial configuration of the designated tool within the tool holder. This movement is between a retracted position and an extended position. A cooler block collet cylindrical in configuration and having a frustrum-shaped configuration with a relatively small angle, and with a frustrum-shaped aperture being positioned concentric with an aperture of the cooler block is also provided. The cooler block collet includes an annulus with a locking means for rotatably locking the collet to the cooler block. The cooler block collet is removable from the cooler block so as to provide for a plurality of interchangeable collets.

The slide assembly includes an extendable and retractable table slide. The depth set means and the clamping means are rigidly mounted to the table slide. The assembly also includes a substantially stationary elongated planar section, which provides a stationary table for purposes of support of the slide assembly. A horizontally oriented planar slide, with the depth set means and clamping means being mounted directly to the planar slide, is also provided. The planar slide includes two parallel sections and an interconnecting perpendicular section, which form a three-sided enclosure around the planar section. The planar slide is telescoped relative to the planar section, so as to be slidable in a longitudinal direction relative to the planar section. A manually manipulable table slide handle is interconnected to the planar slide, so as to allow for extension and retraction of the planar slide relative to the stationary planar section. In this manner, movement is provided of the depth set means and the clamping means relative to the cooler assembly and the heating assembly.

The invention also encompasses a presetting process accurately presetting the position of a tool within a shrink-fit tool holder. The process provides for accurate presetting in a relatively rapid manner, and with a relatively short operating cycle time per tool. The process includes generation of designation signals indicative of designations of specific ones of the tool and the tool holder to be used for a specific cycle. Set length signals are also generated, indicative of an appropriate set length for the designated tool and tool holder. The designated tool holder is then positioned, and a stop means is positioned relative to the designated tool holder, so as to provide a physical abutment for the designated tool. The tool holder is held in an appropriate position within a shrink-fit apparatus, and heating and thermal expansion of the designated tool holder is provided, with the designated tool positioned within the tool holder. The designated tool holder is then cooled.

The process in accordance with the invention may also include compensating changes in dimensions of the designated tool, resulting from temperature for changes in the tool during heating cycles of the shrink-fit process. The presetting process may also include extending and retracting the designated tool and the designated tool holder relative to a cooling assembly and a heating assembly. Further, the process may include an initial length measurement of the designated tool. In addition, the process may also include verification of a preset position of the designated tool within the designated tool holder.

BRIEF DESCRIPTION OF THE SEVERAL VEIWS OF THE DRAWING

The invention will now be described with respect to the drawings in which:

FIG. 9 is somewhat of a perspective view of a portion of the shrink-fit apparatus, illustrating the cooler block in a retracted position, and further illustrating the induction heating element and the tool holder clamping system;

FIG. 10 is a view of the shrink-fit apparatus showing substantially the same elements as illustrated in FIG. 9, but from an opposing perspective angle;

FIG. 11 is somewhat of a perspective view illustrating the table slide of the shrink-fit apparatus in a fully retracted position, with the cooler block assembly retracted and the tool holder clamping system in an "unclamped" configuration;

FIG. 17 is a partial view of the presetter measuring device, illustrating the loading of the tool or end mill into the presetter collet master tool holder;

FIG. 18 illustrates a specific screen which may appear on the PC interface monitor, illustrating an optical representation of the end of the tool, for purposes of measuring an overall length of the tool;

FIG. 19 is a substantially elevational view of a portion of the shrink-fit apparatus, illustrating the loading of the shrink-fit tool holder for tool set up into the tool holder clamping system;

DETAILED DESCRIPTION OF THE INVENTION

The principles of the invention are disclosed, by way of example, in a presetting system 100 as illustrated in FIGS. 1-32. The presetting system 100 is adapted to accurately preset the position of a tool or similar device within a shrink-fit tool holder. In particular, the presetting system 100 in accordance with the invention provides means for axially positioning the tool within a shrink-fit tool holder for high tolerance machining. In addition, and further in accordance with one of the novel concepts of the invention, the presetting system 100 provides a means for incorporating a temperature compensation factor within the presetting process, thereby compensating for temperature and dimensional changes of the tool during heating processes. Still further, the presetting system 100 in accordance with the invention provides a means for presetting shrink-fit tools in a relatively rapid manner, with a minimal operating cycle time per tool.

Figure 1:
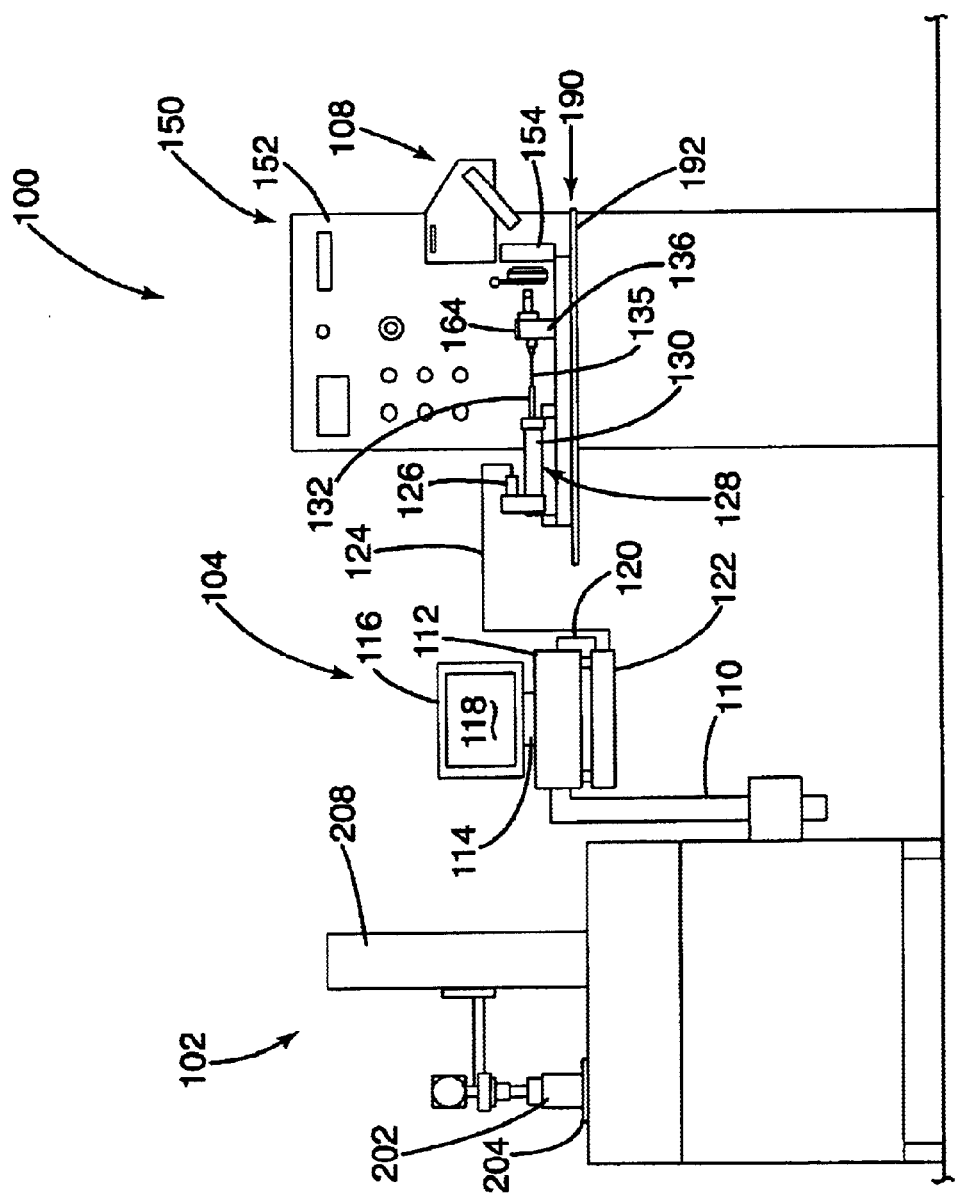
FIG. 1 is an elevation view of a shrink-fit presetting system in accordance with the invention.
Figure 2:
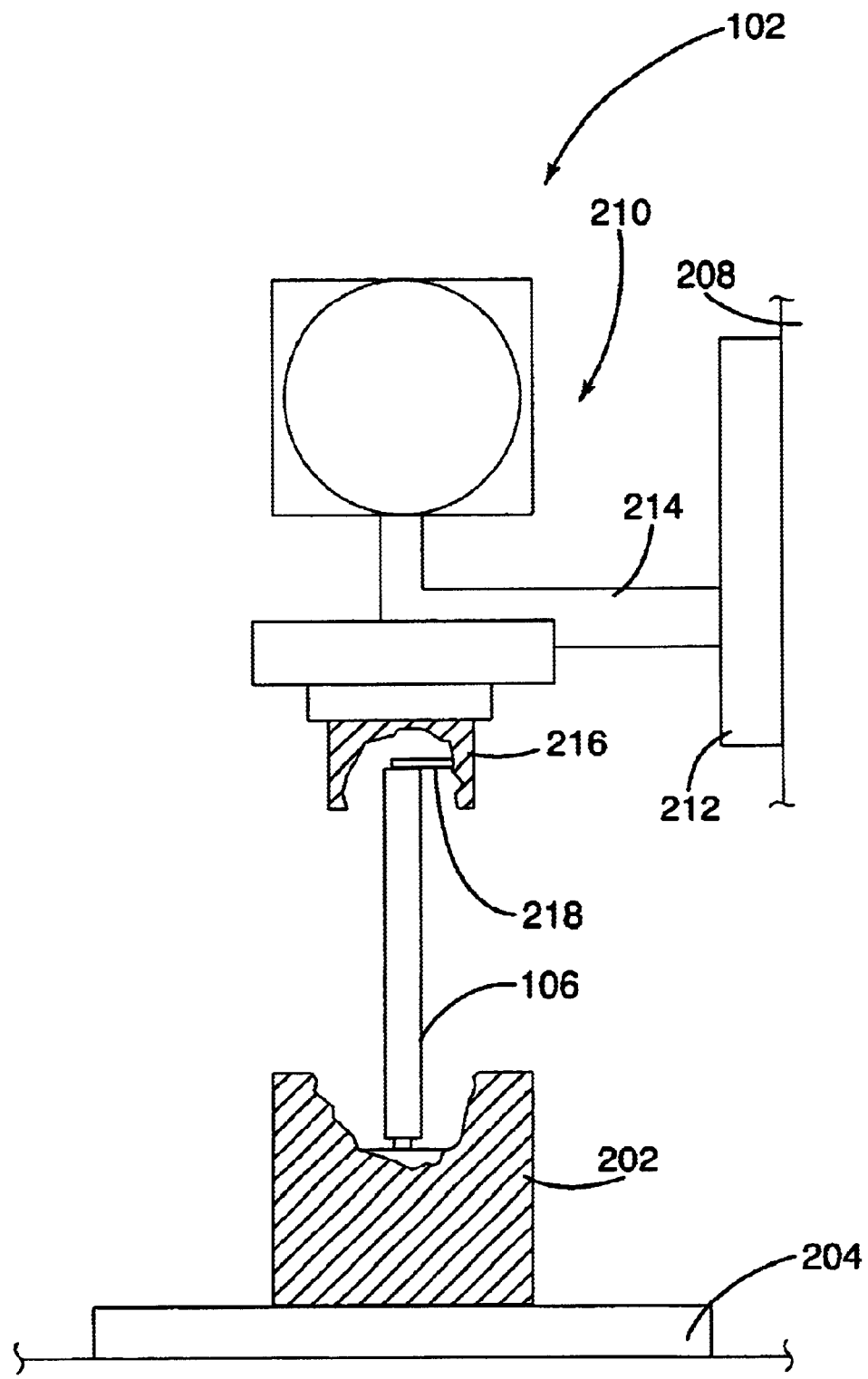
FIG. 2 is somewhat of a "functional" view showing, in part, the presetter measuring device of the presetting system, and further showing functional positioning of the tool or end mill within the device.

Turning to the specific drawings, and using the reference numerals therein, the entirety of the presetting system 100 is illustrated in FIG. 1. The presetting system 100 includes a presetter measuring device 102 which is adapted to provide an initial length measurement of an end mill or tool (illustrated as tool 106 in further drawings) for purposes of setting various parameters and system component positions in other apparatus associated with the presetting system 100. The presetter measuring device 102 also provides a means for verification of the preset position of the tool within the shrink-fit tool holder (and the corresponding set length of the tool and tool holder) following completion of the presetting and shrink-fit process.

A more detailed description of components of the presetter measuring device 102 will be described in subsequent paragraphs herein. However, it should be emphasized that the measuring device 102 primarily provides a means for initial measurement of the length of the tool and verification of set length following processing. Accordingly, although the presetter measuring device 102 may facilitate use of the entirety of the presetting system 100, it does not necessarily form any novel concepts of the presetting system 100 in accordance with the invention. That is, variations and modified configurations of the presetting system 100 may be effected with either a different presetter measuring device or the absence of a presetter measuring device, without departing from the spirit and scope of the novel concepts of a presetting system in accordance with the invention.

With further reference to FIG. 1, the presetter-measuring device 102 is electronically connected to a PC interface system 104. The connection may be made through conventional communication cables 110 or any similar electronic communication arrangement. The purpose of the electronic interconnection between the presetter measuring device 102 and the PC interface system 104 is to provide information from the measuring device 102 to the interface system 104 regarding the initial length of the tool and verification of the set length of the tool and shrink-fit tool holder after completion of the presetting process. The presetter measuring device 102 includes conventional means for converting length measurements into electronic signals applied through the communication cables 110 as input signals to a PC and controller 112 which comprises part of the PC interface system 104. The PC and controller 112 are conventional in nature and include communication lines 114 which electronically interconnect the PC and controller 112 to a PC monitor 116 having a conventional monitor screen 118. The PC and controller 112 also include memory and a database having various parameter specifications associated with the particular types of tools and tool holders which will be utilized with the presetting system 100. The data in the memory of the PC and controller 112 may include, for example, a tool number specifically related to the tool to be preset, the appropriate tool holder to be utilized with the presetter measuring device 102, the correct shrink-fit tool holder for use in the presetting system 100 and other parameters. Such information can be relatively conventional in nature. Data associated with tools and tool holders to be utilized in a shrink-fit configuration can be found in several well-known tooling data texts. Also, the PC and controller 112, along with the PC monitor 116, may comprise commercially available computer apparatus. For example, such apparatus may include a processor configuration of the HP 9000 Series, along with associated peripherals.

Electrical signals associated with various tool and tool holder parameter specifications may be applied as input signals from the PC and controller 112 to presetting system actuator controls 122 through communication cables 120. The presetting system actuator controls 122 essentially comprise an electro-mechanical controller which is utilized to apply control signals to a presetter shrink-fit apparatus 108 through control cables 124.

Continuing with reference in part to FIG. 1, the presetter shrink-fit apparatus 108 incorporates the substantive components of the portion of the presetting system 100 which form the novel concepts of the invention. The presetter shrink-fit apparatus 108 provides a means for accurately presetting tools within shrink-fit tool holders, while accounting for temperature compensation for the tool.

More specifically, and with reference primarily to FIGS. 1, 3, 4, 5, 8 and 11, the presetter shrink-fit apparatus 108 includes a servomotor 126 which is mechanically interconnected to a linear scale depth set assembly 128. The depth set assembly 128 provides a means for positioning a stop rod relative to a shrink-fit tool holder for providing a physical abutment for the tool to be preset, so as to accurately position the tool within the tool holder. The depth set assembly 128 includes an actuator 130 which is directly controlled in a conventional manner by the servomotor 126. The actuator 130 is electrically driven and axially engages a servo-driven actuator rod 132. The actuator rod 132 is axially controllable in its position by the actuator 130. In turn, mechanically interconnected to a terminal end of the servo-driven actuator rod is a stop rod 135. The stop rod 135, as earlier mentioned, is utilized to provide a physical abutment of the tool to be preset within the shrink-fit tool holder.

The presetter shrink-fit apparatus 108 also includes a tool holder clamping system 134 which is utilized for purposes of clamping the shrink-fit tool holder into appropriate position in the presetter shrink-fit apparatus 108. The tool holder clamping system 134 is best illustrated in FIGS. 4, 5, 7, 8 and 19, and includes a clamping block 136 which is rectangular in configuration. The clamping block 136 includes a sizing shank 138, which is substantially cylindrical in configuration and located within an inner aperture of the clamping block 136. The sizing shank 138 is surrounded by and abuts against an annular bushing 140 located within the aperture of the clamping block 136. The sizing shank 138 is one of various interchangeable sizing shanks which may be utilized with the clamping block 136, and provides a through-hole of appropriate size for the shrink-fit tool holder to be utilized in a presetting configuration with the tool.

Figure 4:
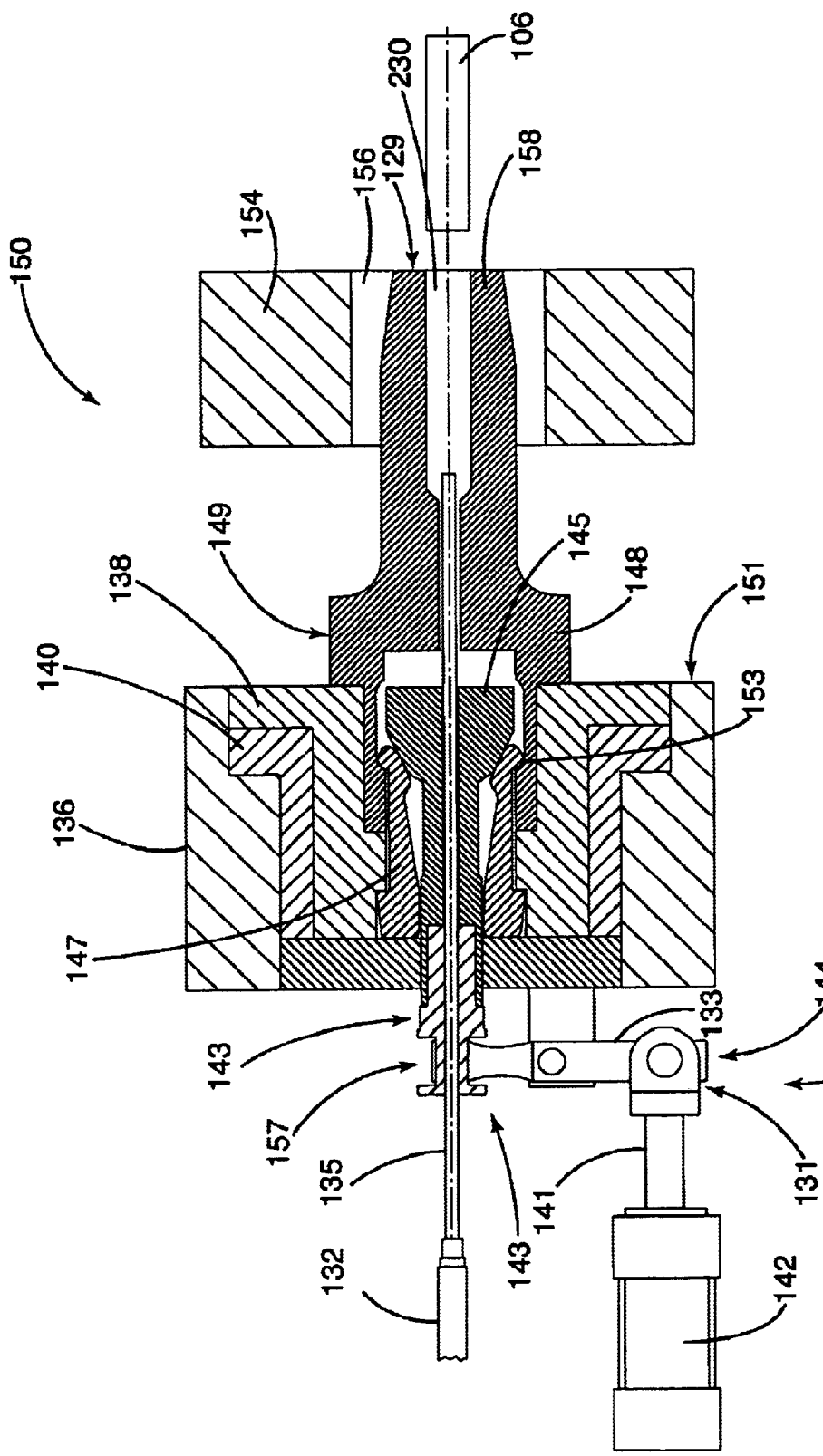
FIG. 4 is a sectional view showing the configuration of various devices of the shrink-fit apparatus of the presetting system, including the induction coil, clamping and holding fixture, servo-driven actuator rod and stop rod, with the tool or end mill shown external to the induction coil and tool holder.
Figure 5:
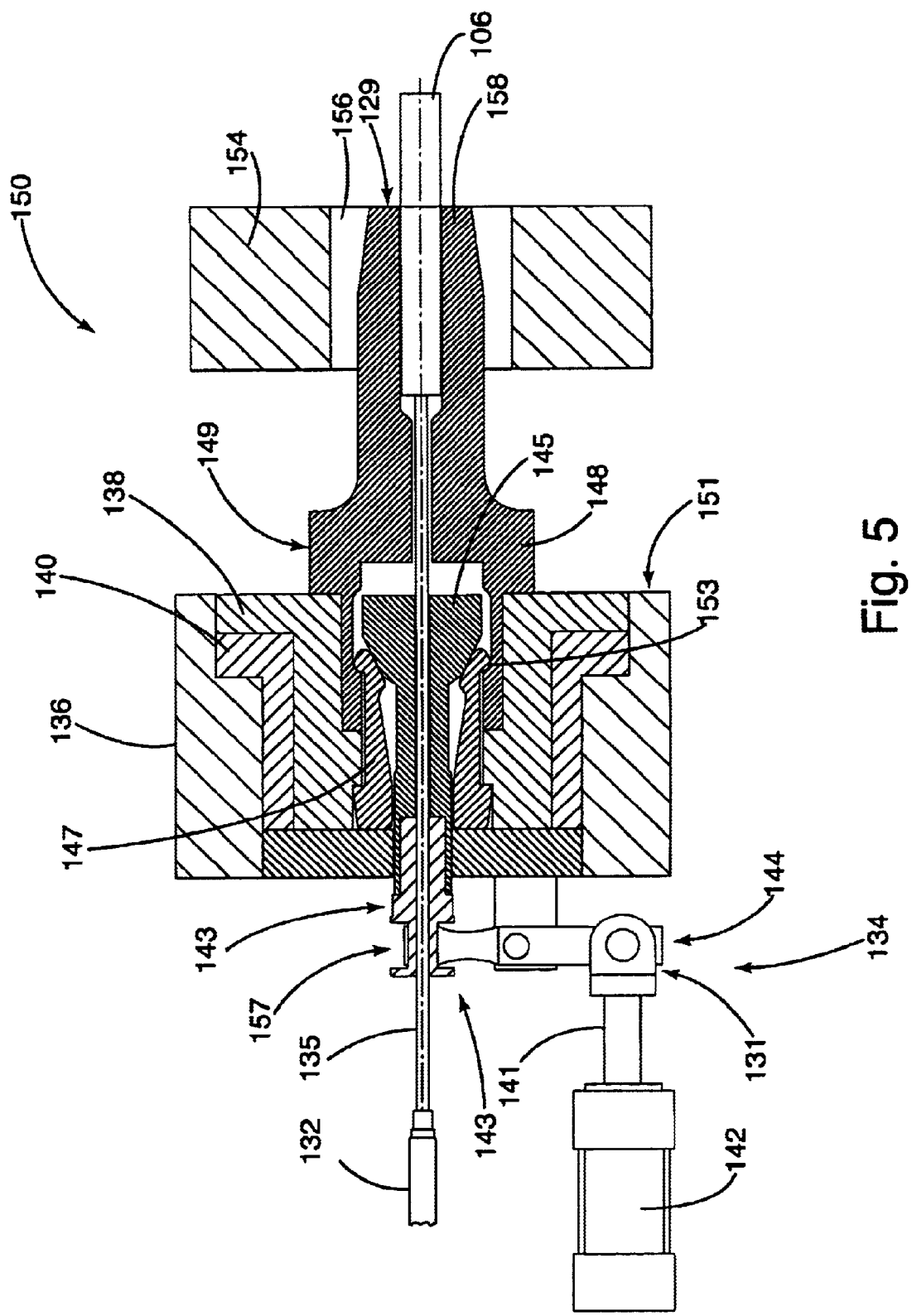
FIG. 5 is an illustration similar to FIG. 4, but showing the tool or end mill positioned within the induction coil and the tool holder.
Figure 7:
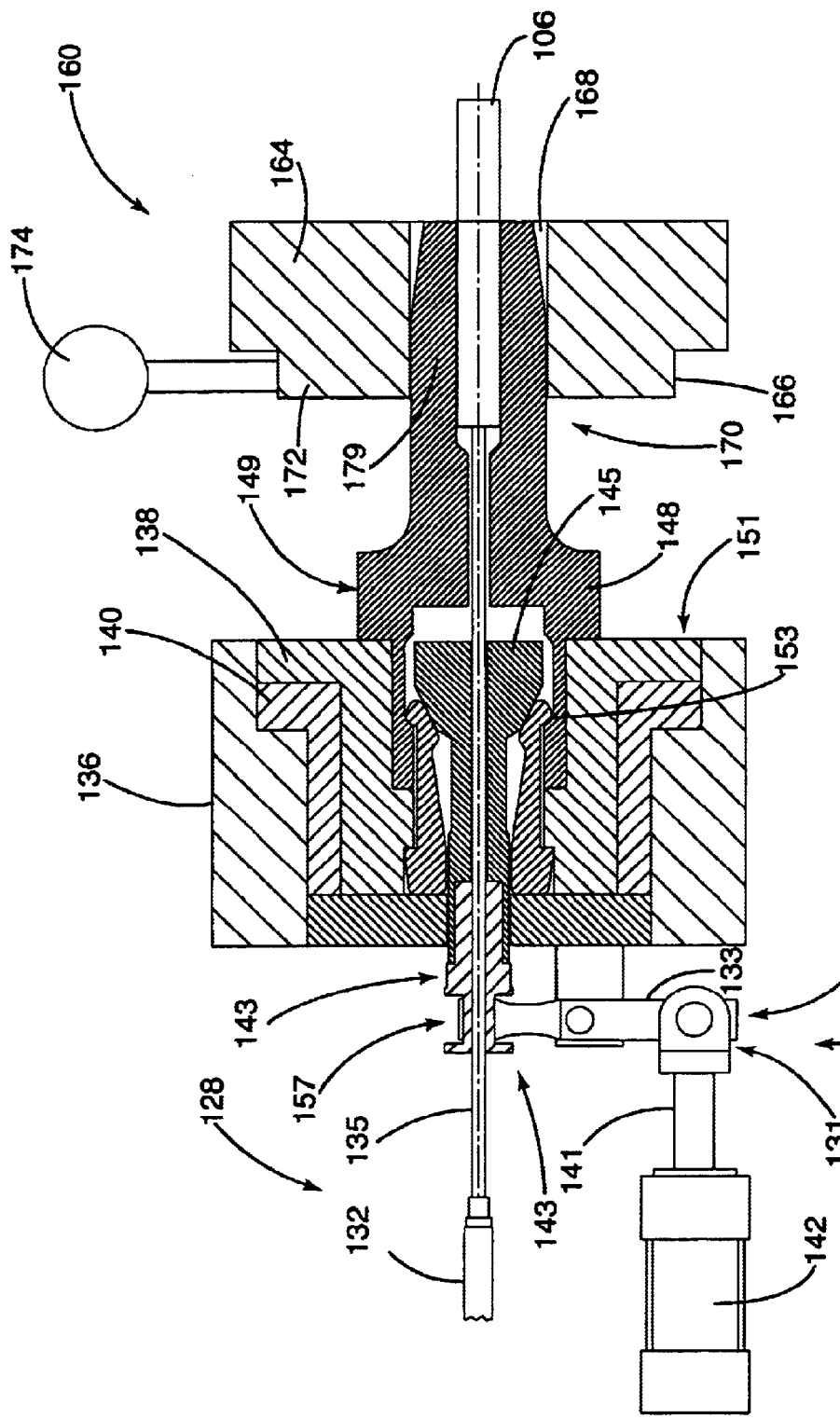
FIG. 7 is a view similar to FIG. 6, but showing a substantially more "close-up" view of the cooler block, clamping and holding fixture, actuator rod and stop rod.

The clamping process for the tool holder clamping system 134 is driven by a controllable pneumatic cylinder 142. The pneumatic cylinder 142 is operable through manual operation of the tool holder clamping system actuator 146, shown in FIG. 8. The controllable pneumatic cylinder 142 drives an interconnected piston 141, primarily shown in FIGS. 4, 5 and 7. The piston 141 is connected at its terminal end to a bar linkage 144. The bar linkage 144 includes a pivot pin connection 131 which interconnects the piston 141 to a pivot bar 133. In turn, the pivot bar 133 is interconnected to the rear portion of an expander assembly 143, a sectional view of which is illustrated in FIGS. 4, 5 and 7. At an opposing end of the expander assembly 143 is a bell-shaped expander 145. The bar linkage 144 is pivotably connected to a rear end of the expander assembly 143 at a pivot connection 157. As further shown in FIGS. 4, 5 and 7, the tool holder clamping system 134 also includes a draw assembly 147 which is annular in structure and includes a forward jaw 153 which has a structural configuration and spatial orientation relative to the bell-shaped expander 145 as illustrated in FIGS. 4, 5 and 7. In operation, the operator manually inserts the selected shrink-fit tool holder 148 into the tool holder clamping system 134. The collar or flange 149 of the tool holder 148, for certain tools and tool holders, may be seated flush against the end face 151 of the clamping block 136. Other types of tools and tool holders may have a space between the flange 149 and end face 151. The tool holder 148 is thus "fitted" within the sizing shank 138. The operator may then engage the clamping system 146, thereby causing the pneumatic cylinder 142 to drive piston 141 in a forward direction. The pivot pin connection 131 of the piston 141 to the bar linkage 144 causes the pivot bar 133 to rotate in a counter-clockwise direction as viewed in FIG. 4. This rotation will cause the expander assembly 143 to move rearward through the pivot connection 157. Rearward movement of the expander assembly 143 correspondingly causes the bell-shaped expander 145 to move rearward. In this manner, the flexible jaw 153 is thereby forced into an outward expansion movement through the engagement of the bell-shaped expander 145 and the rearward movement of the same. This expansion causes the jaw 153 to press against the inner surfaces of the tool holder 148.

The presetter shrink-fit apparatus 108 also includes an induction heating assembly 150 which is utilized to heat and provide thermal expansion of the tool holder 148. The induction heating system 150 is relatively conventional in nature and includes an induction heating controller 152 (FIG. 1) which is utilized to generate heat through an induction process. The induction-heating controller 152 is electrically interconnected to an induction heating unit and coil 154 shown, for example, in FIGS. 3, 4, 5 and 8. The induction heating unit and coil 154 includes a cylindrical aperture 156 through which a terminal portion 158 of the tool holder 148 may extend. Further, the induction heating unit and coil 154 is located relative to the clamping block 136 such that the aperture of the clamping block 136 is concentric with the cylindrical aperture of the heating unit and coil 154. As earlier mentioned, the induction heating system 150 is relatively conventional in nature. For example, the induction heating controller 152 may be one manufactured by the assignee and known as Tooling Innovations TIDD 10/10N1Z.

Figure 8:
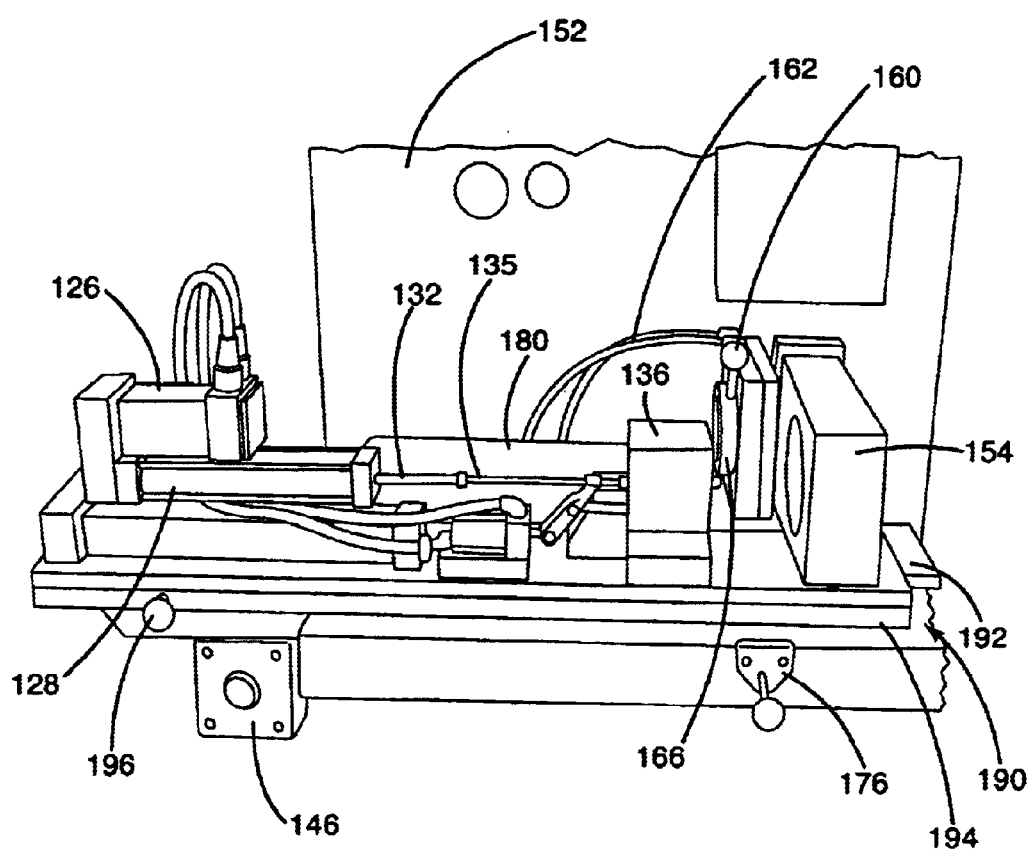
FIG. 8 is somewhat of a perspective view of the shrink-fit apparatus, with the cooler block in a retracted position.
Figure 12:
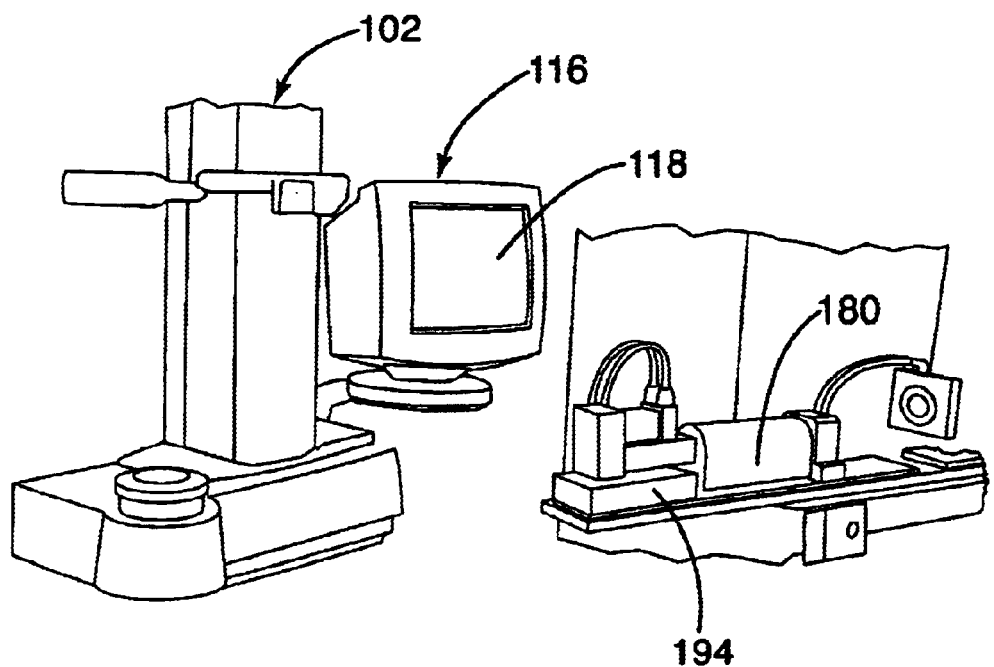
FIG. 12 is a perspective view generally showing the presetter measuring device of the presetting system.
Figure 13:
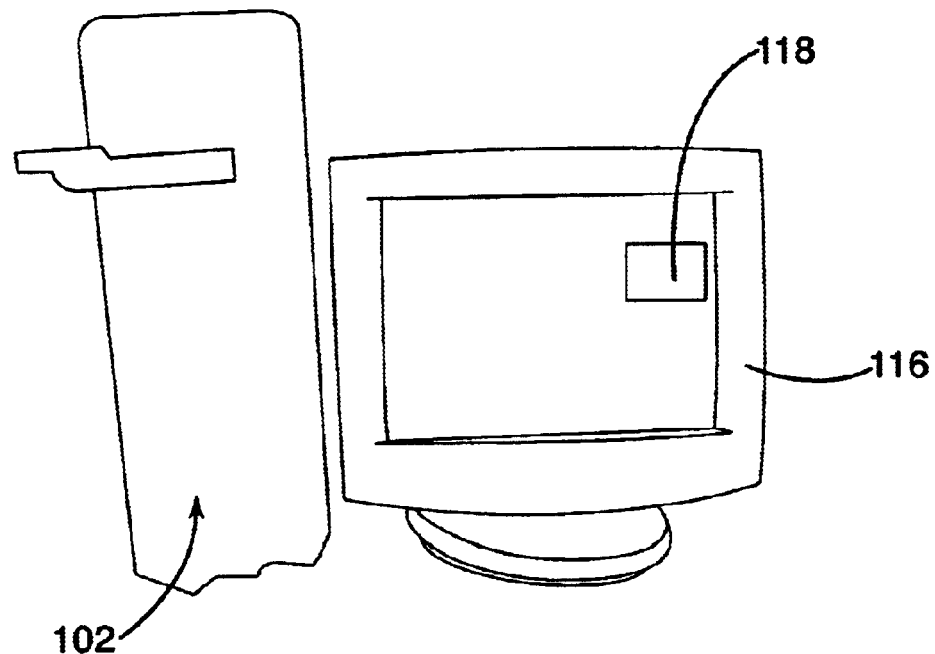
FIG. 13 is a substantially elevational view of the measuring tower of the presetter measuring device and the PC monitor of the PC interface system associated with the presetting system.

In addition to the foregoing elements, the presetter shrink-fit apparatus 108 includes a cooler block assembly 160 which is movable in a lateral direction along a two-dimensional plane relative to the axial configuration of the depth set assembly 128. In FIG. 8, the cooler block assembly 160 is shown in what is characterized herein as a "retracted" position. That is, the cooler block assembly 160 is lateral of a centerline extending through the longitudinal axis of the depth set assembly 128, clamping block 136 and induction heating unit and coil 154. This configuration is specifically illustrated in FIG. 8. The cooler block assembly 160 is physically connected to cooling fluid conduits 162, which are also illustrated in FIG. 8. The cooling fluid conduits 162 are utilized in a conventional manner to inject and remove cooling fluid from the cooler block 164. Accordingly, although not specifically shown in the drawings, the cooler block 164 includes means for circulating cooling fluid from the cooling fluid conduits 162 throughout the block 164. Also associated with the cooler block 164 is a cooler block collet 166 which is primarily shown in FIG. 8 and FIG. 14. The cooler block collet 166 is cylindrical in configuration and includes a somewhat conical or "frustrum-shaped" configuration with a relatively small angle. The frustrum-shaped aperture 170 is positioned concentric with an aperture 168 of the cooler block 164. The cooler block collet 166 includes an annulus 172 which includes a conventional "locking" means for rotatably locking the cooler block collet 166 to the cooler block 164. Rotational locking movement of the cooler block collet 166 is provided through manual manipulation of the cooler block collet handle 174. Various types of commercially available cooler block assemblies may be utilized. One such assembly is marketed by the assignee and known as Tooling Innovations TI 12BB/CUII.

Figure 6:
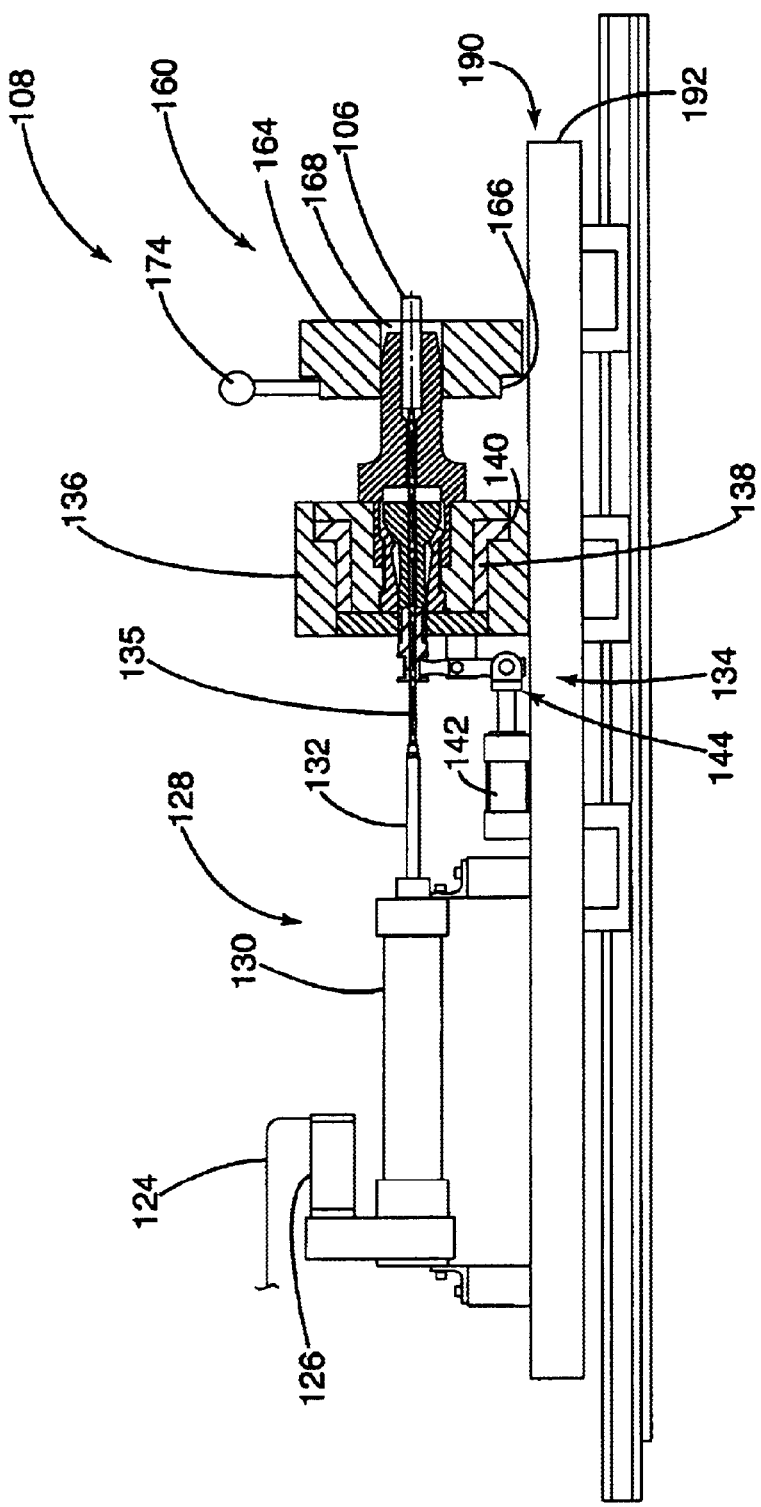
FIG. 6 is an illustration, similar to FIG. 3, but with the tool or end mill shown positioned within the tool holder and with the tool holder and tool positioned within the cooler block.
Figure 14:
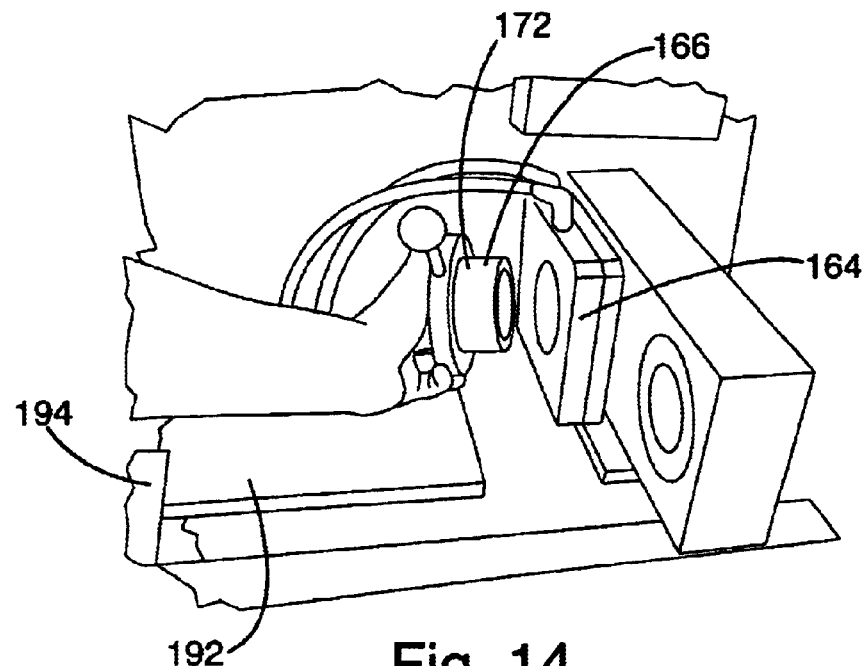
FIG. 14 is somewhat of a perspective illustration of the cooler block assembly of the shrink-fit apparatus, and farther illustrating installation of an appropriate collet into the cooler block assembly.
Figure 24:
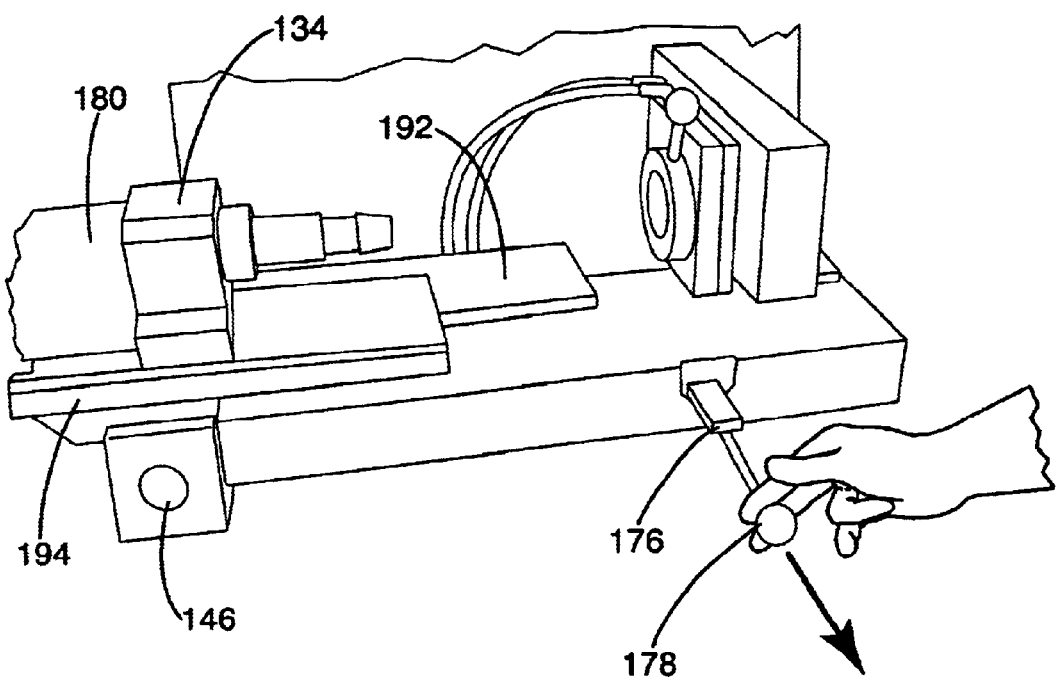
FIG. 24 illustrates extension of the cooler block assembly into an operative, cooling position.
Figure 26:
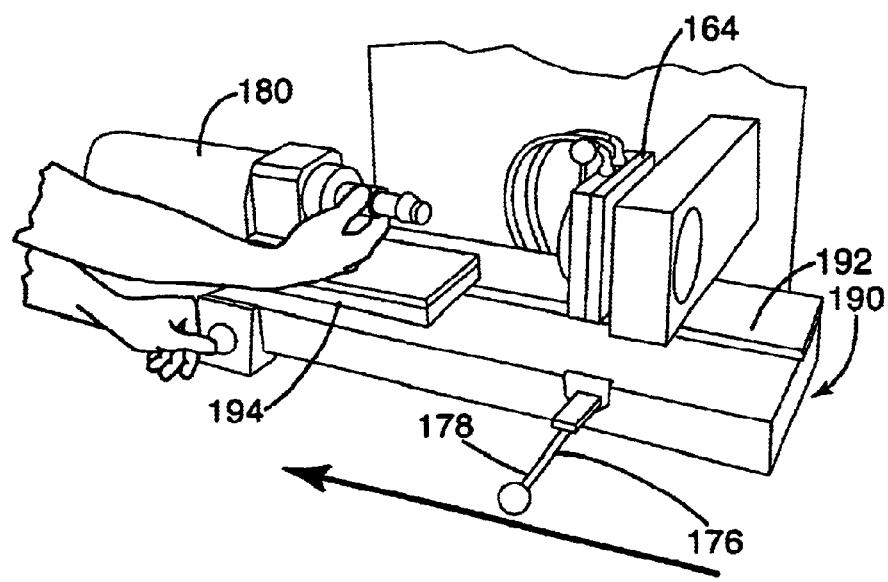
FIG. 26 illustrates the process of retracting the table slide away from the cooler block assembly after the operative cooling cycle has been completed.

As earlier stated, the cooler block assembly 160 is movable between the retracted position illustrated in FIGS. 8 and 14, and an extended position illustrated in FIGS. 6, 7 and 24. With reference to these drawings and to FIG. 8, the cooler block assembly 160 also includes a cooler block handle assembly 176, primarily illustrated in FIGS. 28, 24 and 26. The cooler block handle assembly 176 includes an elongated slide handle 178 which is manually extendible and mechanically interconnected through conventional linkage means (not shown in the drawings) to the cooler block 164. The elongated slide handle 178 is movable in a lateral direction relative to the general configuration of the presetter shrink-fit apparatus 108 between a retracted position as illustrated in FIG. 8, and an extended position as illustrated in FIGS. 24 and 26. With the elongated slide handle 178 manually pulled from its retracted position to its extended position, the mechanical interconnection to the cooler block 164 causes the cooler block 164 (and associated collet 166) to be moved from the corresponding retracted position (FIG. 8) to its extended position as illustrated in FIGS. 24 and 26. As earlier stated, with the cooler block 164 in its extended position, the apertures 168 and 170 are concentric with the centerline of the axis extending through the depth set assembly 128.

It will be evident that the cooler block collet 166 is removable from the cooler block 164 so as to provide for a plurality of interchangeable collets. The cooler block collet 166 to be used for a specific tool and tool holder will be one where the internal nose angle of the collet 166 (i.e., the angle of the fustrum-shaped aperture 170) will appropriately match the angle of the nose 179 of the tool holder 148, or otherwise matches the diameter of the tool 106.

In addition to the foregoing components, the presetting system 100 includes a table slide assembly 190, which is illustrated in various of the drawings, including FIGS. 1, 3, 6, 8, 11, 19, 23, 25, 26, and 27. The table slide assembly 190 comprises an extendible and retractable table slide on which is rigidly mounted the linear scale depth set assembly 128 and the tool holder clamping block 136. More specifically, the table slide assembly 190 includes a substantially stationary and elongated planar section 192. The planar section 192 provides a stationary table for purposes of support of the slide assembly 190. The slide assembly 190 further includes a horizontally oriented planar slide 194. The depth set assembly 128 and the clamping block 136 are mounted by any suitable means (not shown) directly to the planar slide 194. The planar slide 194 essentially comprises two parallel sections and an interconnecting perpendicular section which form a three-sided enclosure around the planar section 192. Further, the planar slide 194 is essentially "telescoped" relative to the planar section 192 so as to be slidable in a longitudinal direction relative to the planar section 192. Positional operation of the planar slide 194 is achieved through manual manipulation of the table slide handle 196 which is interconnected by suitable means (not shown) to the planar slide 194, so as to allow for extension and retraction of the planar slide 194 relative to the stationary elongated planar section 192. In this manner, the table slide assembly 190 provides for movement of the depth set assembly 128 and the clamping block 136 relative to the cooler block 164 and induction heating unit and coil 154. It will be apparent to the skilled practitioner to provide an appropriate mechanical configuration and linkage means so as to permit manipulation of the table slide handle 196 and movement of the planar slide 194 relative to the stationary planar section 192.

In addition to the foregoing components, the presetting system 100 can also include an assembly guard 180, as primarily shown in FIGS. 8, 10, 11, 12, 19, 21, 22, 23, 24, 25, and 27. In particular, FIG. 8 illustrates the assembly guard 180 removed from the depth set assembly 128. Specifically, the assembly guard 180 is utilized to cover and protect relatively sensitive components of the depth set assembly 128 from harsh environmental conditions, such as substantial dust or the like.

An exemplary operation of the presetting system 100 in accordance with the invention will now be described. When a specific end mill or tool 106 is selected by the operator for presetting with the shrink-fit tool holder, the operating personnel may utilize the PC interface system 104 for purposes of determining various parameters associated with the tool and the presetting process. Specifically, the operator may input information into the PC interface system 104 regarding the number or other identifying indicia for the specific tool 106. Using software, including databases associated with the various types of tools which may be preset, parameters associated with the tool 106 may be viewed on the screen 118 of the PC monitor 116. Such information associated with the tool may include, but not be limited to, the following: the particular presetter holder adapter which should be utilized with the presetter measuring device 102 for presetting of the tool 106; determination of the appropriate tool holder or collet master which should be utilized with the presetter holder adapter in the presetter measuring device 102; the appropriate shrink-fit tool holder 148 which should be selected for tool set-up and for insertion into the tool holder clamping system 134; and the appropriate nose angle of the requisite shrink-fit tool holder 148 to be utilized with the presetter shrink-fit apparatus 108. The diameter of the tool 106 will determine the correct cooler block collet 166 to select. It should be emphasized that the presetting system 100 in accordance with the invention illustrates the use of the PC interface system 104 for purposes of determination of the foregoing parameters associated with a particular tool 106. However, these parameters are conventional and well-known in the machining industry, and could be determined from the use of tool database texts or similar materials. However, the use of the PC interface system 104 facilitates determination of these and other parameters in a relatively rapid manner.

Figures 15, 16:
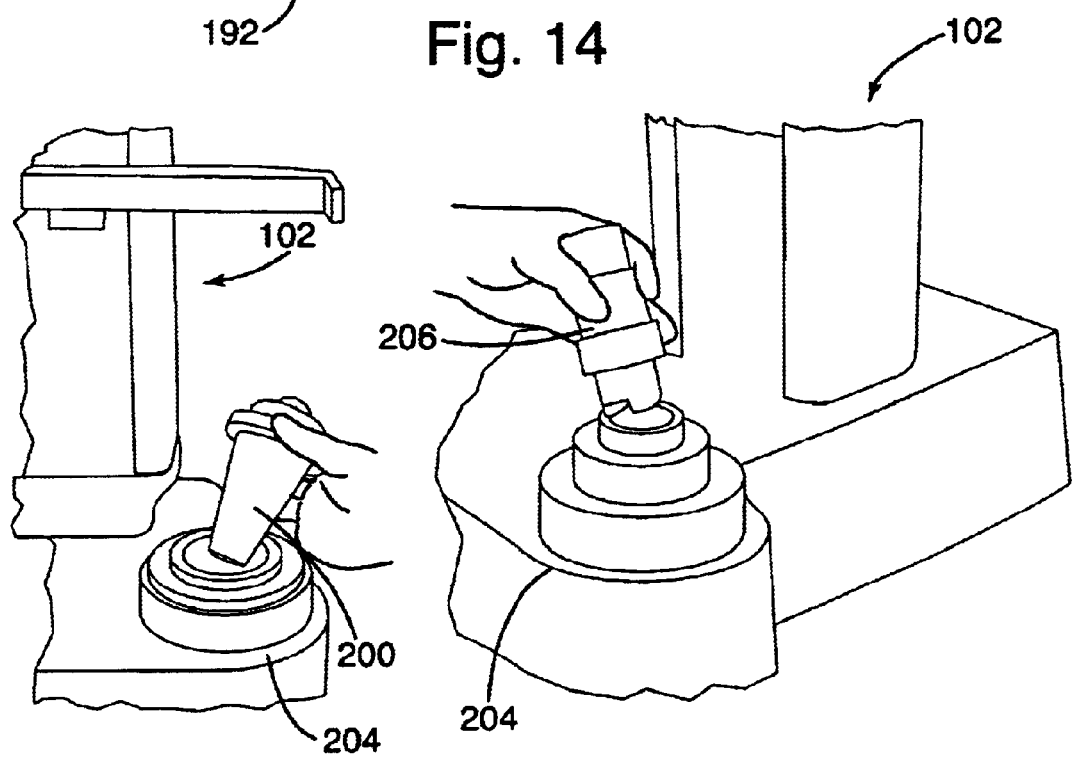
FIG. 15 is a partial illustration of the presetter measuring device, showing insertion of a presetter holder adapter into the presetter spindle.
FIG. 16 is also a partial illustration of the presetter measuring device, showing insertion of the presetter collet master tool holder into the presetter holder adapter.
Figure 20:
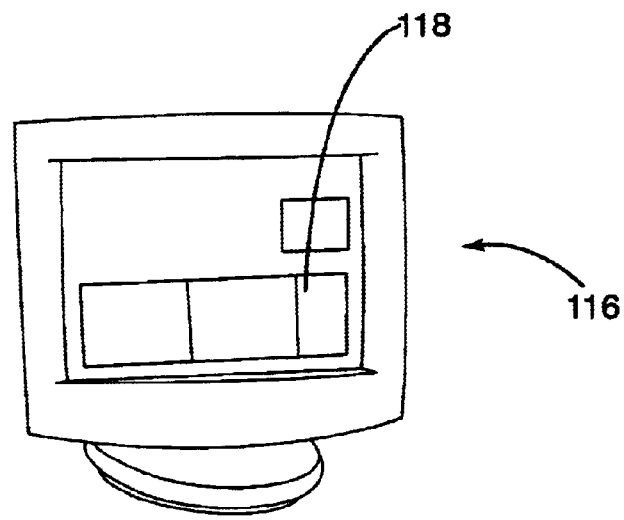
FIG. 20 illustrates an exemplary screen viewed on the PC interface monitor showing presetter height information which may be transferred to the shrink-fit apparatus.
Figure 21:
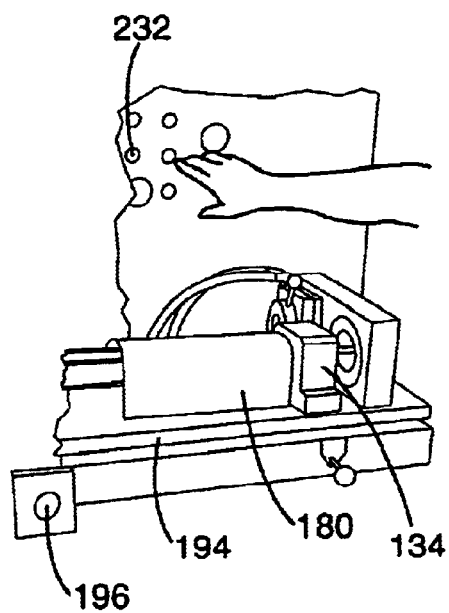
FIG. 21 illustrates personnel initiating a heating cycle for the tool, for purposes of expanding the tool holder.

Following determination of the tool and tool holder parameters, the presetter measuring device 102 will be utilized. With reference primarily to FIGS. 1, 2, and 15-17, a presetter holder adapter 200 (FIG. 15) is inserted into a base spindle 202 of the presetter measuring device 102. The base spindle 202 is mounted on a stationary and planar base 204 of the measuring device 102. Following insertion of the selected presetter holder adapter 200, a correspondingly selected presetter tool holder or collet master 206 is inserted into the selected presetter holder adapter 200 (FIG. 16). As earlier stated, the presetter holder adapter 200 and the presetter tool holder or collet master 206 were selected from a database as parameters specifically associated with the tool 106 selected to be preset.

Following appropriate insertion of the presetter holder adapter 200 into the base spindle 202, and the insertion of the presetter tool holder or collet master 206 into the holder adapter 200, the tool 106 to be preset is inserted into the presetter tool holder or collet master 206 (FIG. 17). Releasable interconnection of the tool 106 with the presetter tool holder or collet master 206 is achieved by relatively well-known and conventional means. After completion of the insertion of the tool 106, the presetter measuring device 102 is utilized to measure the overall length of the tool 106. In this regard, the presetter measuring device 102 includes a measuring tower 208 to which is sidably interconnected an upper gauge assembly 210, which is vertically movable in a conventional manner relative to the tower 208. The upper gauge assembly 210 includes a section 212 which provides the vertically slidable and movable interconnection between the gauge assembly 210 and the tower 208. The section 212 is rigidly interconnected to an arm 214. The arm 214 is further rigidly connected to a horizontally disposed collar 216 having an aperture extending partially therethrough for receiving the upper portion of the tool 106. Positioned within the collar 216 is an upper cap gauge 218. The upper cap gauge 218 is mechanically and electrically interconnected to other components of the measuring device 102 by conventional means (not shown) so as to provide a measurement of the positional orientation of the upper end of the tool 106. In this manner, with the spatial orientation of the lower end of the tool 106 being known (in view of the known specifications of the holder adapter 200 and tool holder 206), the overall length of the tool 106 can be determined. The foregoing is an example of one configuration of a presetter measuring device 102. Various commercially available devices could be utilized. One appropriate device is marketed by the assignee and known as the Speroni SPT 34 System.

The overall length of the tool 106, after being determined through use of the presetting measuring device 102, can be input to the PC interface system 104 through previously described communication cables 110. It should be mentioned that the "preset point" of the tool 106, when being measured on the measuring device 102, will be matched to the "preset point" in the tool management database. The signals applied from the presetter measuring device 102 to the PC interface system 104, being at least in part representative of the overall length of the tool 106, can be utilized with software and databases within the PC interface system 104 so as to determine the "stop" point for the linear scale depth set assembly 128. That is, with a determination of the overall length of the tool 106 through use of the measuring device 102, and through use of the database parameters stored in memory of the PC interface system 104, electrical signals can be appropriately provided as input signals from the PC interface system 104 to the servomotor 126 of the depth set assembly 128. In turn, and responsive to the input signals from the PC interface system 104, the servomotor 126 will act so as to operate the depth set assembly 128. Specifically, with the transfer of the presetter length information for the tool 106 to the depth set assembly 128, the actuator 130 is responsive to the servomotor 126 so as to extend the servo-driven actuator rod 132 forward from the actuator 130. In turn, the stop rod 135 is correspondingly extended. The specific extension of the stop rod 135 will be dependent upon the measured overall length of the tool 106 and the particular database parameters for the tool 106 and the tool holder 148, which are utilized by conventional algorithms so as to determine the appropriate position of the stop rod 135.

More specifically, and with reference to FIG. 5, the tool holder 148 will be positioned for HSK standard tools so that its collar 149 will be substantially "flush" against an end face 151 of the clamping block 136. For other tools and tool holders, the collar or flange 149 may be spaced a distance apart from the end face 151. The stop rod 135 will be extended a predetermined distance beyond the face 151 of the clamping block 136. This distance will be based on the measured length of the tool 106 and various database parameters associated with the tool 106 and tool holder 148. In general, a concept associated with the use of the clamping block 136 is to simulate mutual tool holder spindle conditions, and to establish a "zero plane" for the simulated spindle face.

In accordance with one of the novel concepts of the invention, the PC interface system 104 and the associated tool databases can be utilized to add a "compensation factor" to the particular positional determination for the servo-driven actuator rod 132 and the stop rod 135. In this manner, a presetter system in accordance with the invention will compensate for changes in dimensions of the tool 106 resulting from temperature changes in the tool 106 during heating cycles of the shrink-fit process. That is, the depth set assembly 128, operating in combination with other elements of the presetter system 100, provide a means for positioning of the stop rod 135 so as to compensate for temperature changes in the tool 106.

As will be apparent to the skilled practitioner, the transfer of information from the PC interface system 104 to the depth set assembly 128 regarding appropriate positioning of the stop rod 135 can be initiated by any conventional means, such as providing an information transfer process utilizing a keyboard or mouse (not shown) of the PC interface system 104, manually engaged by the operator.

Either before or after information is transferred to the depth-set assembly 128 from the PC interface system 104, the selected shrink-fit tool holder 148 may be inserted into the tool holder clamping system 134. Manual insertion by an operator is illustrated in FIG. 19. The position of the appropriately selected tool holder 148 into the clamping block 136 is also shown in various other drawings, including FIGS. 3, 4 and 5. For purposes of securing the tool holder 148 in the clamping block 136, the operator first positions the tool holder 148 for HSK standard tools so that its collar 149 is flush with the end face 151 of the clamping block 136 and "fitted" within the sizing shank 138. For other types of tools and tool holders, the collar 149 may be spaced apart from the end face 151. The operator may then engage the clamping system actuator 146. This engagement causes the pneumatic cylinder 142 to drive its piston 141 forward. The rotatable interconnection of the piston 141 to the bar linkage 144 causes the expander assembly 143 to be moved rearward. This rearward movement causes the bell-shaped expander 145 to correspondingly move rearward, thereby expanding and pressing the jaw 153 of the jaw assembly 147 against the inner surfaces of the tool holder 148.

Figure 3:
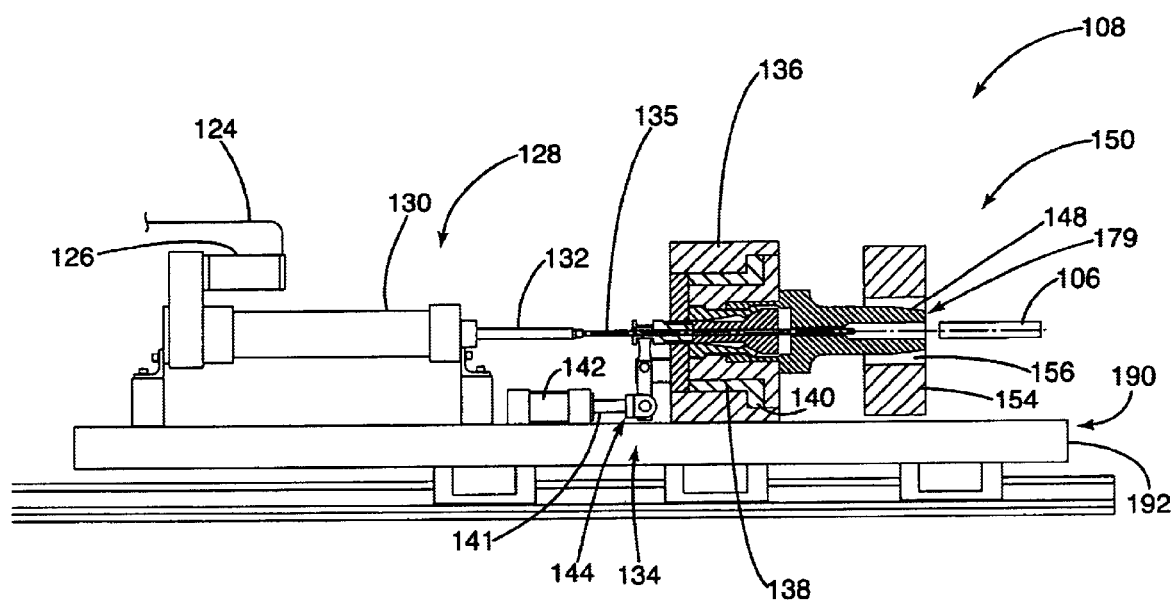
FIG. 3 is a partial elevation view of the presetting system as shown in FIG. 1, and specifically illustrating the shrink-fit apparatus of the presetting system.

Following appropriate clamping of the tool holder 148 within the clamping block 136, the table slide assembly 190 may be utilized so as to move the depth set assembly 128 and the clamping block 136 toward the induction heating unit and coil 154. The induction heating unit and coil 154 is positioned slightly above the table slide assembly 190. As shown particularly in FIGS. 3 and 4, the table slide assembly 190 is engaged so as to slide the planar slide 194 (relative to the stationary elongated planar section 192) toward the induction heating unit and coil 154. The process of moving the table slide assembly 190 toward the induction heating unit and coil 154 can be achieved through manual operation of the table slide handle 196. The planar slide 194 is moved a sufficient distance so as to position the tool holder 148 such that the end of the tool holder nose 179 is substantially flush with the far end of the induction heating unit and coil 154. This particular configuration is illustrated in FIGS. 3, 4 and 5.

Figure 22:
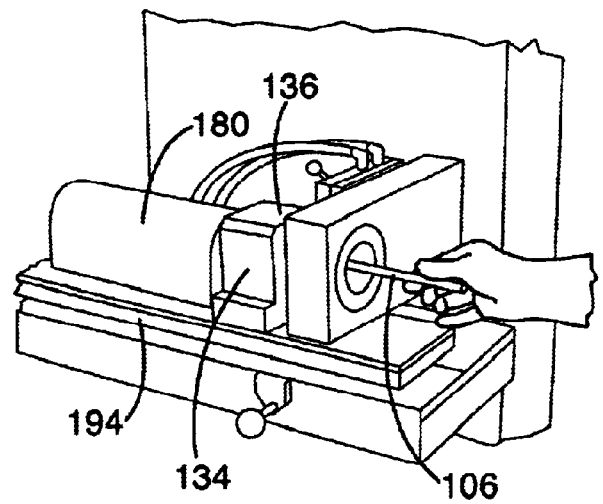
FIG. 22 illustrates personnel inserting the tool into the preheated tool holder.
Figure 23:
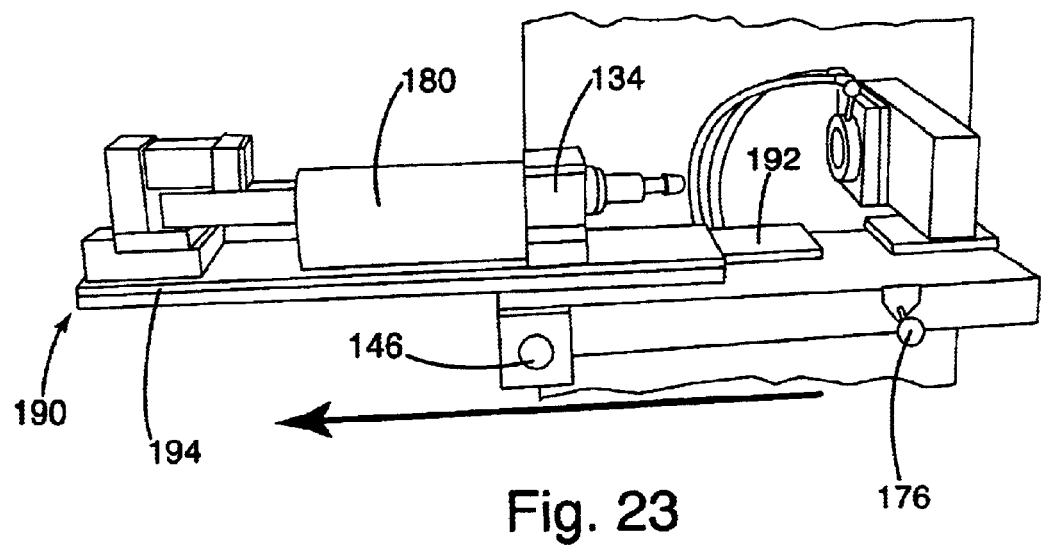
FIG. 23 illustrates the process of sliding the table slide assembly to the retracted position.

It should be emphasized that the foregoing process not only properly positions the tool holder 148 relative to the induction heating unit and coil 154, but also provides (with the appropriate movement of the table slide assembly 190) appropriate positioning of the stop rod 135 within the tool holder 148. After completion of this process, the tool 106 can be removed from the presetter measuring device 102, and readied for insertion into the tool holder 148. However, prior to this insertion, the terminal end 158 of the tool holder 148 is heated through operation of the induction heating system 150. Specifically, a heat cycle is initiated for the induction heating system 150 through manual operation and the use of the induction heating controller 152. Lights, LEDs, or other visual indicia may be associated with the induction heating controller 152 so as to indicate when the heat cycle is initiated. During the heat cycle, the inner diameter of the aperture 230 of the tool holder 148 will exhibit thermal expansion. With many tool holders used in the art, this inner diameter expansion of the aperture 132 may be on the order of 0.001 inch. Also, with many tool holders utilized in the machining industry, the appropriate heat cycle may be in the range of 7 to 10 seconds. When the heat cycle has been completed, visual indicia (such as indicia 232 illustrated in FIG. 21) may signal completion of the heat cycle. The tool holder 148 is then in an appropriate state so as to receive the tool 106. The operator then inserts the tool 106 into the preheated tool holder 148, so that the terminal end of the tool 106 abuts the terminal end of the stop rod 135. This process is illustrated in FIG. 22. The operator will then lightly press and hold the tool 106 against the stop rod 135 for an appropriate period of time. Prior tests associated with experimental use of a presetter system in accordance with the invention indicate that this period of time is typically within the range of six to ten seconds. This period of time is sufficient so as to cause the terminal portion 158 of the tool holder 148 to securely engage the tool 106 with correct setting of the tool depth within the tool holder 148.

Following the operator maintaining the tool 106 within the pre-heated tool holder 148 against the stop rod 135, it is possible to have the PC interface system 104 and the induction heating controller 152 cause the servo-driven actuator rod 132 (and, correspondingly, the stop rod 135) to retract rearward of the induction heating unit and coil 154 after a predetermined period of time. For example, the actuator rod 132 may be retracted after a period of thirty seconds following initiation of the heating cycle. After the actuator rod 132 and stop rod 135 have been retracted by the depth set assembly 128, the operator can then manually slide the table slide assembly 190 to its retracted position. That is, with respect to FIG. 23, the planar slide 194 will move to the left of the drawing. It should be noted that during this retraction and positioning of the table slide assembly 190 in the retracted position, the tool 106 is mounted within the tool holder 148.

When the table slide assembly 190 has been moved to its retracted position, the operator can engage the cooler block handle assembly 176 and elongated slide handle 178 so as to "pull" the cooler block 164 toward the operator, as illustrated in FIG. 24. Preferably, the cooler block assembly will include a stop or other appropriate means (not shown) so as to prohibit the cooler block 164 from moving beyond an appropriate and fully extended position. With the cooler block 164 in the position illustrated in FIG. 24, and as earlier stated, the aperture 168 of the cooler block 164 is concentric with the axis of the tool 106 mounted within the tool holder 148.

When the cooler block 164 is in the fully extended position (again, as illustrated in FIG. 24) the operator may engage the table slide handle 196 so as to move the planar slide 194 toward the right as viewed in FIG. 24. The planar slide 194 should be moved a sufficient distance so that the tool holder nose 179 is in contact with the cooler block 164. It is not necessary or appropriate for the nose 179 of the tool holder 148 to be extended completely to the far end of the cooler block 164. Instead, the table slide assembly 190 should be moved such that the nose 179 of the tool holder, which may be angled, appropriately engages the internal nose angle of the cooler block 164 so as to provide for maximum surface area contact. Such an orientation is illustrated in FIGS. 6 and 7. The cooler block assembly 160 may then be initiated into a cooling cycle by manual operation or other suitable combination of manual and mechanical or electrical means. During operation, cooling fluid will flow through the cooling fluid conduits 162. As earlier stated, the cooling fluid flowing through the conduits 162 will also flow through the cooler block 164.

During the cooling process, the tool holder 148 will shrink as it cools down within the cooler block 164. Preferably, although not an absolute necessity with respect to the primary novel concepts of the invention, it may be advantageous to include control processes which will cause the table slide assembly 190 to automatically "lock" for a predetermined period of time during the cooling cycle. This locking of the table slide assembly 190 will facilitate maximum cooling and will also provide for additional safety. From experimental use of a presetting system in accordance with the invention, the appropriate period of time for cooling may be in the range of 1.5 to 2 minutes. After such period of time, it is advantageous to include visual indicia (such as a light, LED or the like) to indicate the end of the cooling cycle. Controls can also be incorporated within the system so as to cause the table slide assembly 190 to be "unlocked" following termination of the cooling cycle.

It is apparent that specific electrical, mechanical and/or pneumatic apparatus for providing control of the cooling cycle, locking of the table slide and generation of visual indicia associated with the cooling cycle are not described in minute detail herein. However, it will be apparent to those skilled in the art of control system apparatus to utilize appropriate devices for providing the foregoing components and functions.

Figure 25:
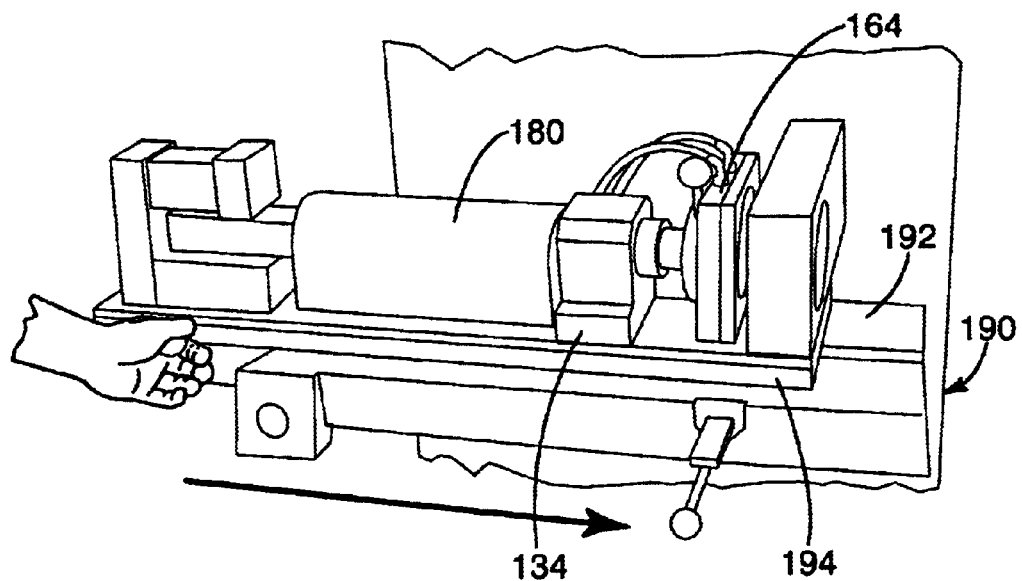
FIG. 25 illustrates the position of various components of the shrink-fit apparatus during the cooling cycle for the shrink-fit tool holder.

The relative positioning of various components of the presetter shrink-fit apparatus 108 during the cooling cycle are illustrated in FIG. 25. Following termination of the cooling cycle, the operator may engage the table slide handle 196 so as to retract the planar slide 194 away from the cooler block 164. As illustrated in FIG. 26, the operator may then utilize the tool holder clamping system actuator 146 so as to disengage the clamping system 134 and unclamp the tool holder 148 from the clamping system 134. This process will involve retraction of the piston 141, thereby causing the expander assembly 143 to move forward and release the jaw 153 of the jaw assembly 147. The tool holder 148 (and interconnected tool 106) can then be manually removed from the clamping system 134. This process is illustrated in FIG. 26.

Figure 27:
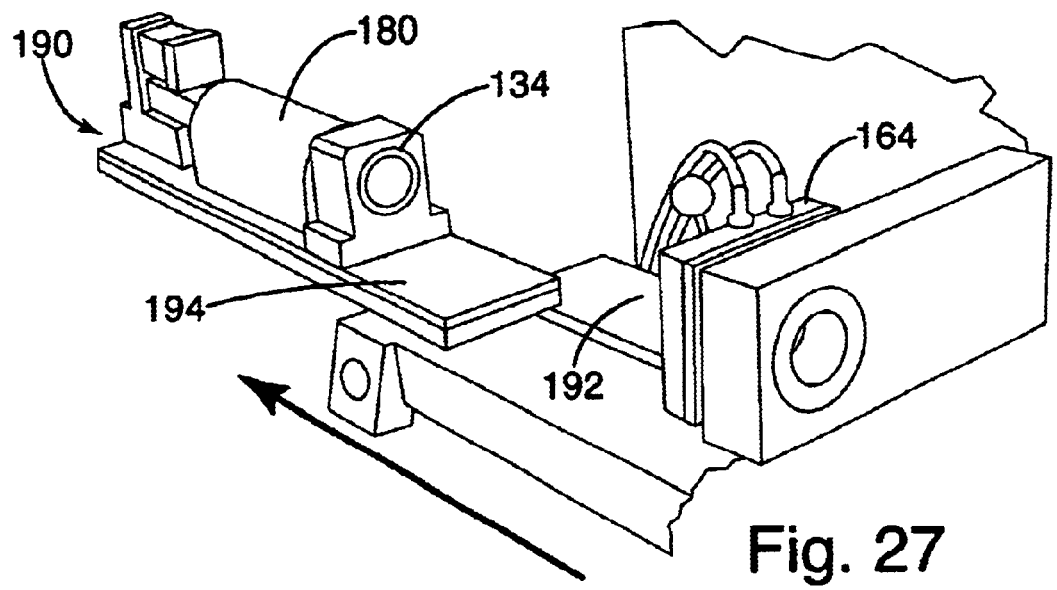
FIG. 27 illustrates the full retraction of the table slide assembly to an initial or "start" position.
Figure 28:
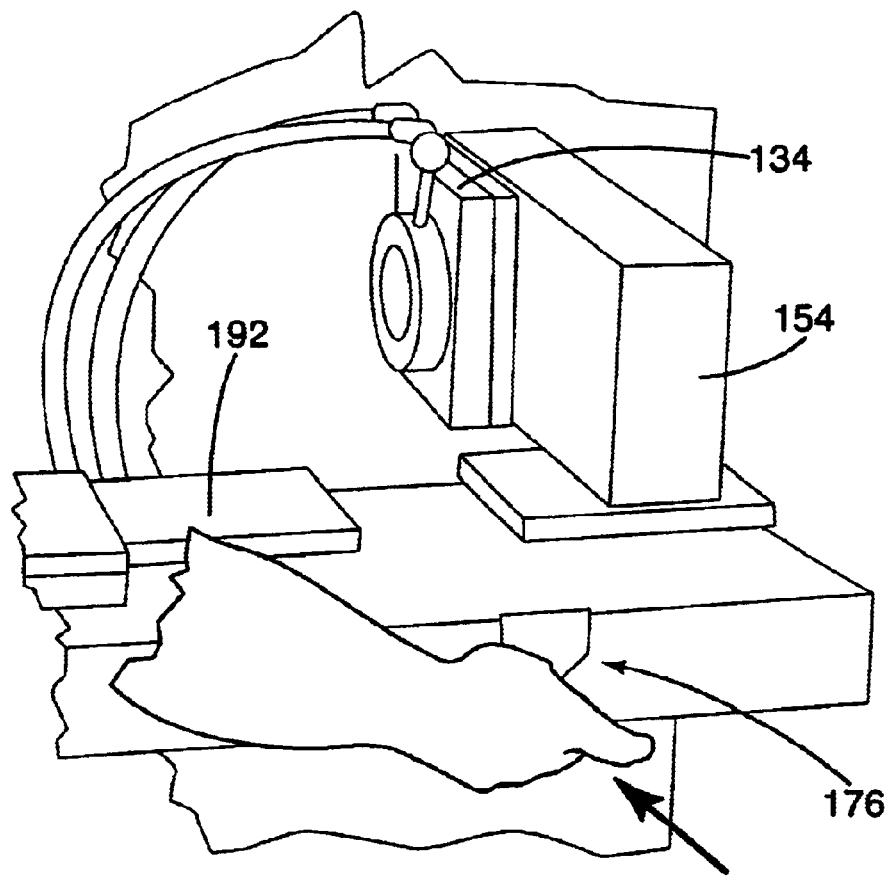
FIG. 28 illustrates retraction of the cooler block assembly to its fully retracted or "start" position.
Figure 29:
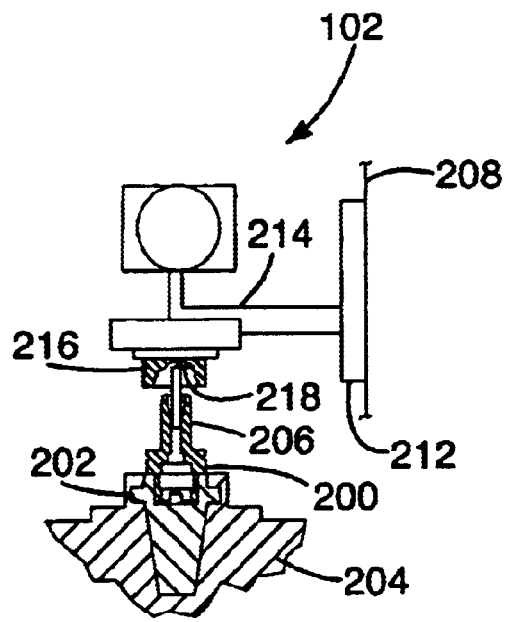
FIG. 29 is a partial elevation and sectional view of the presetter measuring device in accordance with the invention.
Figure 30:
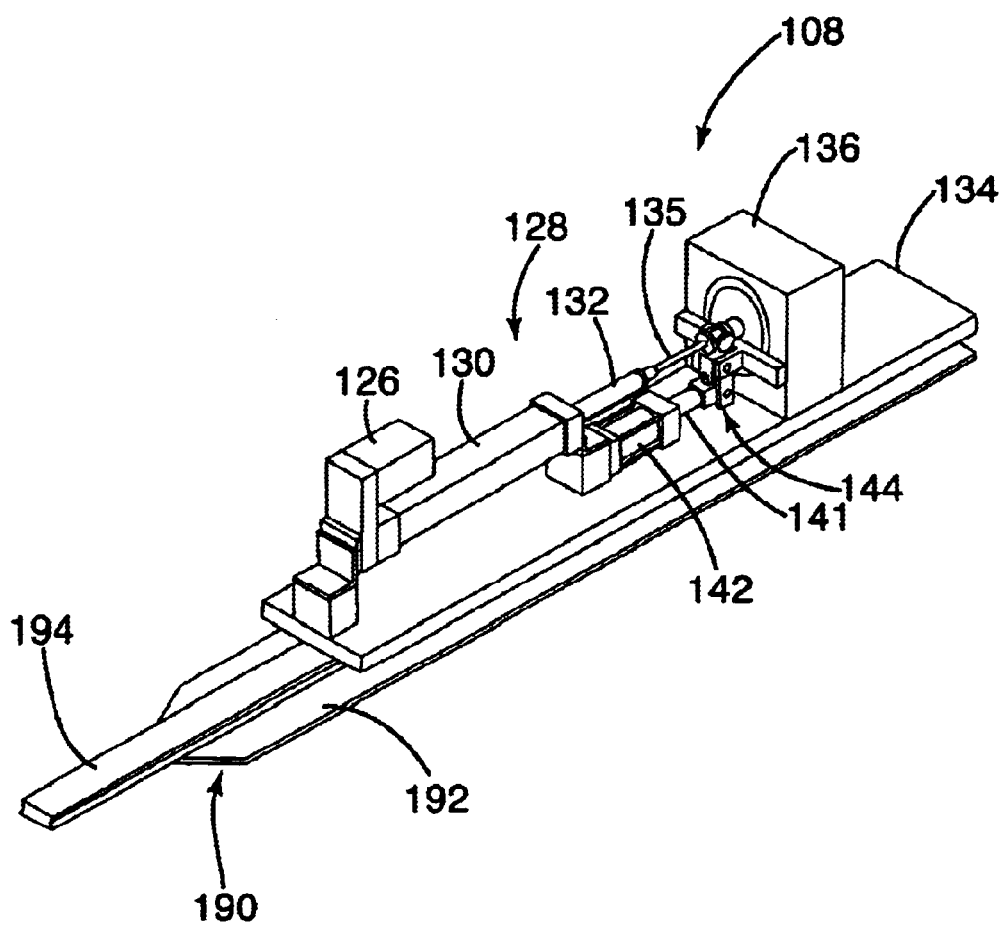
FIG. 30 is a perspective view of the presetter shrink-fit apparatus of the presetting system in accordance with the invention.
Figure 31:
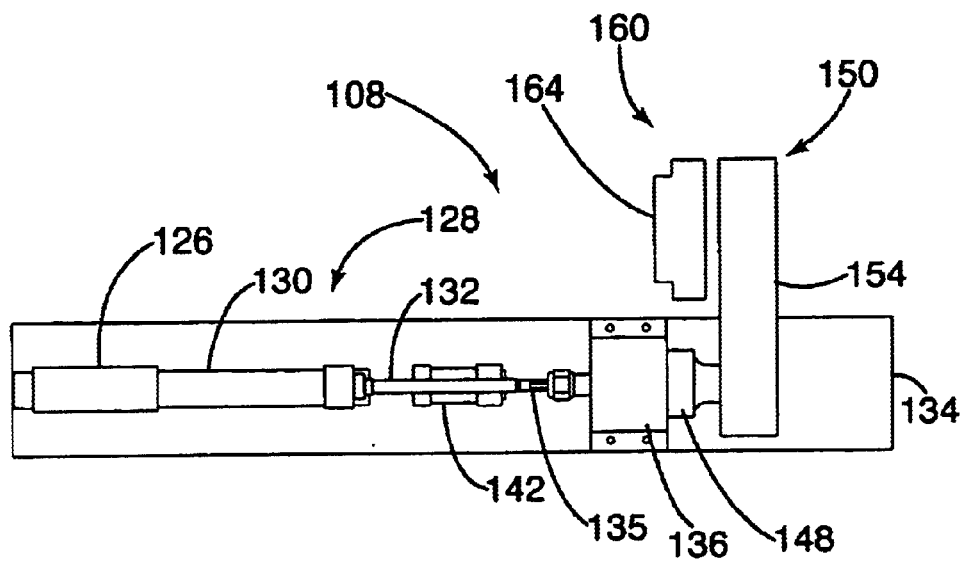
FIG. 31 is a plan view of a portion of the presetter shrink-fit apparatus, showing the cooling block in accordance with the invention in a retracted position.
Figure 32:
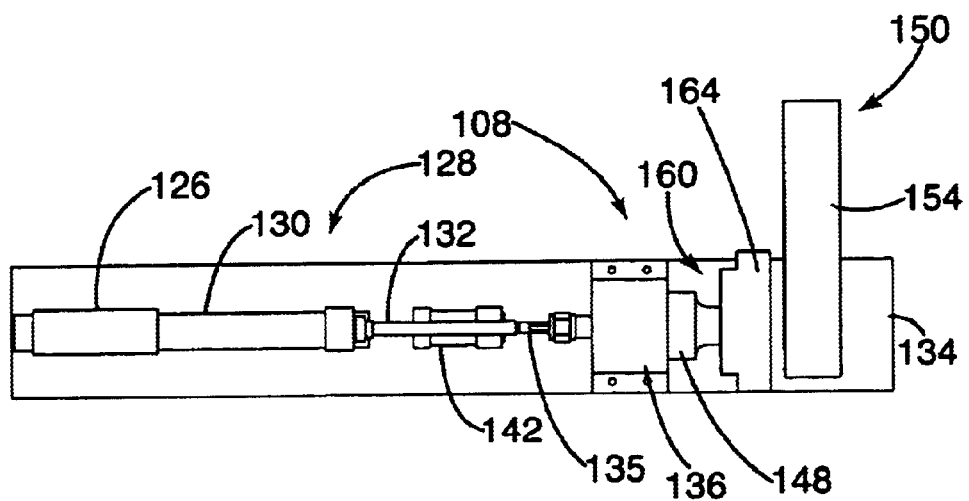
FIG. 32 is a plan view of a portion of the presetter shrink-fit apparatus in accordance with the invention, substantially similar to FIG. 31, but illustrating the cooling block in accordance with the invention in an extended position.
Figure 33:
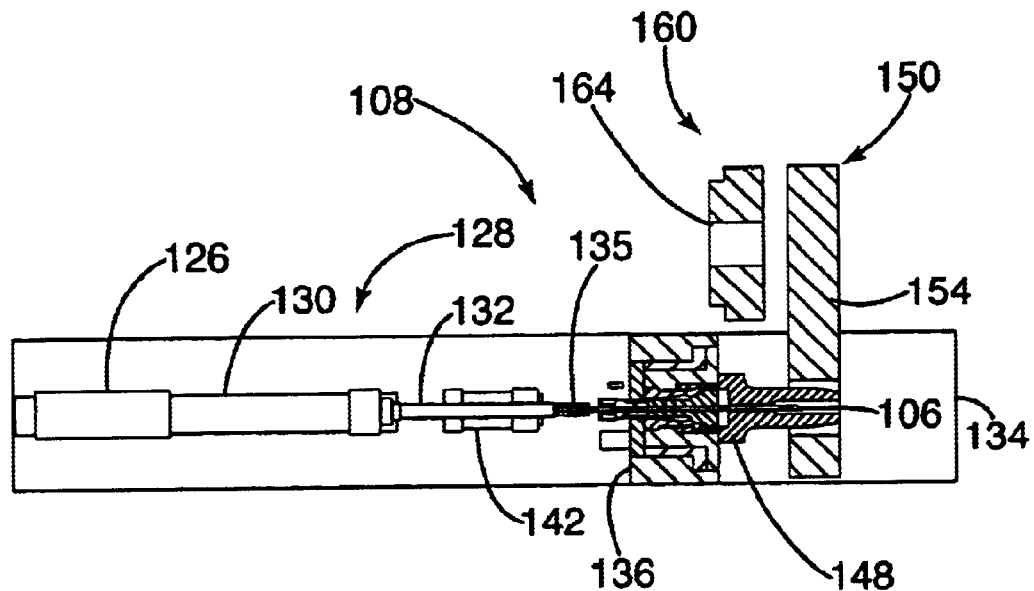
FIG. 33 is a sectional plan view of the presetter shrink-fit apparatus components illustrated in FIG. 31.
Figure 34:
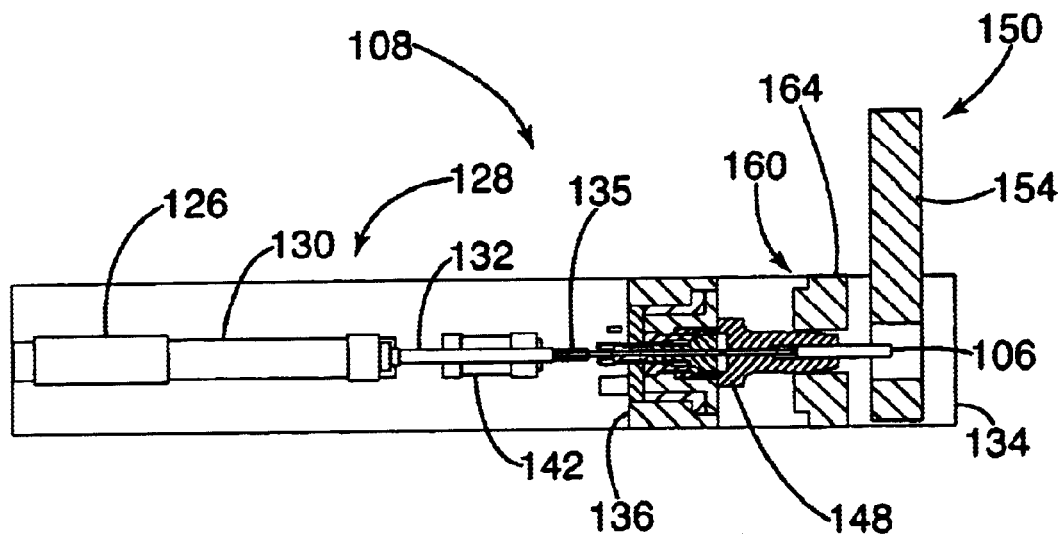
FIG. 34 is a sectional plan view of the presetter shrink-fit apparatus components illustrated in FIG. 32.

After removal of the tool holder 148 and interconnected tool 106, the table slide assembly 190 may again be actuated so as to fully retract the planar slide 194 to its initial or "start" position. This retraction is illustrated in FIG. 27. Following retraction of the table slide 190, the operator may engage the cooler block handle assembly 176 so as to retract the cooler block 164 and associated collet 166 to its retracted or "start" position. This position is again lateral of the centerline of the longitudinal axis of the depth set assembly 128. The operation to retract the cooler block 164 and its positioning in the start position is illustrated in FIG. 28.

The final process of retracting the cooler block assembly 160 completes the presetting process. The presetting system 100 is then ready to receive the next tool 106 for presetting and positioning within an appropriate shrink-fit tool holder 148. Experimental use of a presetting system 100 in accordance with the invention has indicated that an approximate and apparently normal operating cycle time for the entirety of the processes as described herein is in the range of 3 to 6 minutes per tool.

A presetting system in accordance with the invention clearly provides several significant advantages. The system permits high accuracy in axially positioning a tool within a shrink-fit tool holder for high tolerance machining. In particular, a presetting system in accordance with the invention provides a means for accurate positioning of tools even in relatively non-conventional machining systems, such as machine tools utilizing a plurality of tools and tool holders within a single driven head. In addition, and also in accordance with one of the novel concepts of the invention, a presetting system in accordance with the invention provides a means for incorporating a temperature compensation factor within the presetting process, thereby compensating for dimension changes of the tool resulting from temperature variations during the heating process. Still further, a presetting system in accordance with the invention provides a means for presetting shrink-fit tools in a rapid manner, with a relatively minimal operating cycle time per tool.

It will be apparent to those skilled in the pertinent art that other embodiments of presetting systems in accordance with the invention can be designed and implemented. That is, the principles of a system for presetting shrink-fit tools are not limited to the specific embodiments described herein. For example, various types of PC interface systems, servomotors and the like can be employed within the presetting system. In particular, processes described herein may be implemented by the use of various electrical, pneumatic and mechanical means, although the embodiments herein may be described as using only one of these means. As a more specific example, the depth set assembly 128 is disclosed as being controlled by a servomotor 126. However, the assembly 128 could be controlled pneumatically or even by manual operation. Accordingly, it will be apparent to those skilled in the art that modifications and other variations of the above-described illustrative embodiments of the invention may be effected without departing from the spirit and scope of the novel concepts of the invention.

What is claimed is:

1. A presetting system for accurately presetting the position of a tool within a shrink-fit tool holder, with said presetting occurring in a relatively rapid manner, with a relatively short operating cycle time per tool, said presetting system comprising:
   means for generating designation signals indicative of designations of specific ones of said tool and said tool holder to be used for a specific presetting process cycle;
   means for generating set length signals indicative of an appropriate set length for said designated tool and tool holder;
   presetter shrink-fit apparatus responsive to said designation signals and to said set length signals for presetting the position of said designated tool within said designated tool holder, said apparatus comprising:
   stop means;
   depth set means for positioning said stop means relative to said designated tool holder, so as to provide a physical abutment for said designated tool;
   clamping means for holding said tool holder in an appropriate position within said shrink-fit apparatus;
   a heating assembly utilized to heat and provide thermal expansion of said designated tool holder; and
   a cooler assembly utilized to cool said designated tool holder.

2. A presetting system in accordance with claim 1, characterized in that said system further comprises compensation means for compensating for changes in dimensions of said designated tool resulting from temperature changes in said designated tool during a heating cycle of the shrink-fit process.

3. A presetting system in accordance with claim 1, characterized in that said system further comprises a slide assembly for mounting said depth set means and said clamping means, so as to be extendable and retractable relative to said cooling assembly and said heating assembly.

4. A presetting system in accordance with claim 3, characterized in that said slide assembly comprises:
- an extendable and retractable table slide on which is rigidly mounted said depth set means and said clamping means;
- a substantially stationary and elongated planar section, providing a stationary table for purposes of support of said slide assembly;
- a horizontally oriented planar slide, with said depth set means and said clamping means being mounted directly to said planar slide;
- said planar slide comprising two parallel sections and an interconnecting perpendicular section, forming a three-sided enclosure around said planar section;
- said planar slide being essentially telescoped relative to said planar section, so as to be slidable in a longitudinal direction relative to said planar section; and
- a manually manipulable table slide handle interconnected to said planar slide, so as to allow for extension and retraction of said planar slide relative to said stationary elongated planar section, thereby providing for movement of said depth set means and said clamping means relative to said cooler assembly and said heating assembly.

5. A presetting system in accordance with claim 1, characterized in that said system further comprises a measuring device having length measuring means for providing an initial length measurement of said designated tool.

6. A presetting system in accordance with claim 5, characterized in that said measuring device comprises verification means for verification of a preset position of said designated tool within said designated tool holder.

7. A presetting system in accordance with claim 1, characterized in that said cooler assembly comprises means for moving said assembly in a lateral direction along a two dimensional plane, relative to the positioning of said designated tool within said depth set means.

8. A presetting system in accordance with claim 1, characterized in that said system farther comprises system actuator controls for applying said set length signals to said presetter shrink-fit apparatus.

9. A presetting system in accordance with claim 1, characterized in that said heating assembly comprises an induction heating system.

10. A presetting system in accordance with claim 1, characterized in that said shrink-fit apparatus further comprises motor means mechanically interconnected to said depth set means.

11. A presetting system in accordance with claim 10, characterized in that said depth set means comprises:
- an actuator directly controlled by said motor means, with said actuator axially engaging a servo-driven actuator rod;
- said actuator rod being axially controllable in its position by said actuator; and
- said stop means being mechanically interconnected to a terminal end of said servo-driven actuator rod.

12. A presetting system in accordance with claim 11, characterized in that said stop means comprises a stop rod mechanically interconnected to said terminal end of said servo-driven actuator rod, with said stop rod providing a physical abutment of said designated tool within said shrink-fit tool holder.

13. A presetting system in accordance with claim 1, characterized in that said cooler assembly comprises:
- a cooler block handle assembly having an elongated slide handle manually extendable and mechanically interconnected through linkage means to a cooler block, said elongated slide handle being movable in a lateral direction relative to an axial configuration of said designated tool within said designated tool holder, between a retracted position and an extended position;
- a cooler block collet cylindrical in configuration and having a frustrum-shaped configuration with a relatively small angle, and with a frustrum-shaped aperture being positioned concentric with an aperture of said cooler block;
- said cooler block collet having an annulus with a locking means for rotatably locking said collet to said cooler block; and
- said cooler block collet being removable from said cooler block so as to provide for a plurality of interchangeable collets.

14. A presetting process for accurately presetting the position of a tool within a shrink-fit tool holder, in a relatively rapid manner, and with a relatively short operating cycle time per tool, said process comprising:
- generating designation signals indicative of designations of specific ones of said tool and said tool holder to be used for a specific presetting process cycle;
- generating set length signals indicative of an appropriate set length for said designated tool and tool holder;
- positioning said designated tool holder;
- positioning a stop means relative to said designated tool holder, so as to provide a physical abutment for said designated tool;
- holding said tool holder in an appropriate position within a shrink-fit apparatus;
- heating and providing thermal expansion of said designated tool holder, with said designated tool positioned within said designated tool holder; and
- cooling said designated tool holder.

15. A presetting process in accordance with claim 14, characterized in that said process further comprises compensating for changes in dimensions of said designated tool, resulting from temperature changes in said designated tool during heating cycles of said shrink-fit process.

16. A presetting process in accordance with claim 14, characterized in that said process further comprises extending and retracting said designated tool and said designated tool holder relative to a cooling assembly and a heating assembly.

17. A presetting process in accordance with claim 14, characterized in that said process further comprises an initial length measurement of said designated tool.

18. A presetting process in accordance with claim 14, characterized in that said process further comprises verification of a preset position of said designated tool within said designated tool holder.

* * * * *